(12) United States Patent
Kitamura et al.

(10) Patent No.: US 8,824,863 B2
(45) Date of Patent: Sep. 2, 2014

(54) INFORMATION PROCESSING APPARATUS, INFORMATION PROCESSING METHOD, INFORMATION PROCESSING PROGRAM, AND INFORMATION PROCESSING SYSTEM

(75) Inventors: Yusuke Kitamura, Tokyo (JP); Tsuyoshi Kawabe, Tokyo (JP); Yoshiaki Shibata, Kanagawa (JP)

(73) Assignee: Sony Corporation, Tokyo (JP)

( * ) Notice: Subject to any disclaimer, the term of this patent is extended or adjusted under 35 U.S.C. 154(b) by 92 days.

(21) Appl. No.: 13/240,145

(22) Filed: Sep. 22, 2011

(65) Prior Publication Data

US 2012/0087640 A1    Apr. 12, 2012

(30) Foreign Application Priority Data

Oct. 7, 2010    (JP) ................................ P2010-227501

(51) Int. Cl.
*H04N 5/761* (2006.01)
(52) U.S. Cl.
USPC .......................................... 386/282; 386/280
(58) Field of Classification Search
None
See application file for complete search history.

(56) References Cited

U.S. PATENT DOCUMENTS

| | | | |
|---|---|---|---|
| 2004/0064207 A1* | 4/2004 | Zacks et al. | 700/91 |
| 2009/0148124 A1* | 6/2009 | Athsani et al. | 386/46 |
| 2010/0030642 A1* | 2/2010 | Huffman et al. | 705/14.49 |

FOREIGN PATENT DOCUMENTS

| | | |
|---|---|---|
| JP | 2010-11409 | 1/2010 |
| WO | WO 2007/004699 | 1/2007 |

\* cited by examiner

*Primary Examiner* — William C Vaughn, Jr.
*Assistant Examiner* — Eileen Adams
(74) *Attorney, Agent, or Firm* — Frommer Lawrence & Haug LLP; William S. Frommer

(57) ABSTRACT

Provided is an information processing apparatus including: a receiving unit which receives event information capable of specifying a type of an event; a template acquiring unit which acquires a template of the event of the type specified by the event information received by the receiving unit as a template which becomes a source of an editing list of a plurality of scenes; an editing list creating unit which creates the editing list of the plurality of scenes based on the template acquired by the template acquiring unit; and a digest creating unit which creates data of the plurality of scenes included in the editing list created by the editing list creating unit from one or more photographed materials acquired from another information processing apparatus and creates a digest by combining the created data of the plurality of scenes.

12 Claims, 14 Drawing Sheets

FIG. 6

| EVENT NAME: HOME RUN | | | | |
|---|---|---|---|---|
| CONDITIONAL SENTENCE: (1)×(2)+(3×4)+··· | | | | |
| CONDITION NUMBER | TARGET MATERIAL | CLASSIFICATION | DETAILED CONDITION | COMMENT |
| 1 | CAMERA M | AUDIO | KEYWORD: "HOME RUN" | DETECT THAT ANNOUNCER ISSUES KEYWORD OF "HOME RUN" THROUGH AUDIO ANALYSIS |
| 2 | CAMERA M | AUDIO | KEYWORD: "FLYING INTO STANDS" | DETECT THAT ANNOUNCER ISSUES KEYWORD OF "FLYING INTO STANDS" THROUGH AUDIO ANALYSIS |
| 3 | CAMERA C | IMAGE | KEYWORD: "BALL IS FLYING INTO STANDS" | DETECT THAT BALL IS FLYING INTO STANDS THROUGH IMAGE ANALYSIS |
| 4 | CAMERA K | AUDIO | KEYWORD: "LARGE CHEERS COME" | DETECT THAT LARGE CHEERS COME FROM STANDS THROUGH AUDIO ANALYSIS |
| ··· | ··· | ··· | ··· | ··· |
| n | | | | |

FIG. 8

| TEMPLATE NAME: TEMPLATE FOR HOME RUN | | | | | | | |
|---|---|---|---|---|---|---|---|
| UPDATE DATE: 2010-04-01 | | | | | | | |
| SCENE NUMBER | COMMENT | MATERIAL | IN POINT | OUT POINT | DURATION | EFFECT | SPEED (%) | AUDIO LEVEL (db) |
| 1 | PITCHER IS PITCHING BALL | CAMERA E | -00:00:15:00 | -00:00:10:00 | 00:00:05:00 | DISSOLVE | 100 | 0 |
| 2 | HIT | CAMERA B | -00:00:10:00 | -00:00:07:00 | 00:00:03:00 | DISSOLVE | 100 | 0 |
| 3 | PITCHER UP | CAMERA E | -00:00:08:00 | -00:00:04:00 | 00:00:04:00 | DISSOLVE | 100 | 0 |
| 4 | BALL IS FLYING TOWARD STANDS | CAMERA C | -00:00:04:00 | 00:00:00:00 | 00:00:04:00 | DISSOLVE | 100 | -3 |
| 5 | BATTER UP | CAMERA D | -00:00:01:00 | 00:00:03:00 | 00:00:04:00 | DISSOLVE | 100 | 0 |
| ... | ... | ... | ... | ... | ... | ... | ... | ... |
| 9 | SCORE DISPLAY | CG1 | — | — | 00:00:02:00 | — | 100 | -2 |
| 10 | HOME RUN (SLOW) | CAMERA E | -00:00:10:00 | -00:00:07:00 | 00:00:03:00 | — | 50 | 0 |

FIG. 9

```
1   <?xml version="1.0 encoding="utf-8"?>
2   <templete title= "TEMPLATE FOR HOME RUN"updateDate="2010-04-01">
3       <scene index="1">
4           <comment>PITCHER IS PITCHING BALL</comment>
5           <source> CAMERA E </source>
6           <inTimecode>-00:00:15;00</inTimecode>
7           <outTimecode>-00:00:10;00</outTimecode>
8           <duration>00:00:05;00</duration>
9           <effect> DISSOLVE </effect>
10          <speed>100</speed>
11          <audioLevel>0</audioLevel>
12      </scene>
13      <scene index="2">
14          <coment>  HIT  </coment>
15          <source> CAMERA B</source>
16          <inTimecode>-00:00:10;00</inTimecode>
17          <outTimecode>-00:00:07;00</outTimecode>
18          <duration>00:00:03;00</duration>
19          <effect> DISSOLVE </effect>
20          <speed>100</speed>
21          <audioLevel>0</audioLevel>
22      </scene>
23      <scene index="3">
24          <coment> PITCHER UP </coment>
25          <source>CAMERA E </source>
26          <inTimecode>-00:00:08;00</inTimecode>
27          <outTimecode>-00:00:04;00</outTimecode>
28          <duration>00:00:04;00</duration>
29          <effect> DISSOLVE </effect>
30          <speed>100</speed>
31          <audioLevel>0</audioLevel>
32      </scene>
33      <scene index="4">
34          <coment>BALL IS FLYING TOWARD STANDS</coment>
35          <source> CAMERA C </source>
36          <inTimecode>-00:00:04;00</inTimecode>
37          <outTimecode>00:00:00;00</outTimecode>
38          <duration>00:00:04;00</duration>
39          <effect> DISSOLVE </effect>
40          <speed>100</speed>
41          <audioLevel>-3</audioLevel>
42      </scene>

. . .
            . . .

</digestTemplete>
```

FIG. 10

| EVENT NAME | TEMPLATE NAME | TEMPLATE PATH |
|---|---|---|
| HOME RUN | TEMPLATE FOR HOME RUN | C:\...\homerun.xml |
| GRAND SLAM | TEMPLATE FOR GRAND SLAM | C:\...\grand_slam_hr.xml |
| GAME-REVERSING HOME RUN | TEMPLATE FOR GAME-REVERSING HOME RUN | C:\...\come_from_behind_hr.xml |
| BUNT | TEMPLATE FOR BUNT | C:\...\bunt.xml |
| ... | ... | ... |

FIG. 12

```
1   <?xml version="1.0" encoding="utf-8"?>
2   <edl title="20100401-19-00-00-00">
3           <scene index="1">
4                   <comment> PITCHER IS PITCHING BALL </comment>
5                   <source> CAMERA E </source>
6                   <inTimecode>18:59:45;00</inTimecode>
7                   <outTimecode>18:59:50;00</outTimecode>
8                   <duration>00:00:05;00</duration>
9                   <effect> DISSOLVE </effect>
10                  <speed>100</speed>
11                  <audioLevel>0</audioLevel>
12          </scene>
13          <scene index="2">
14                  <coment> HIT </coment>
15                  <source> CAMERA B </source>
16                  <inTimecode>18:59:50;00</inTimecode>
17                  <outTimecode>18:59:53;00</outTimecode>
18                  <duration>00:00:03;00</duration>
19                  <effect> DISSOLVE </effect>
20                  <speed>100</speed>
21                  <audioLevel>0</audioLevel>
22          </scene>
23          <scene index="3">
24                  <coment> PITCHER UP </coment>
25                  <source> CAMERA E </source>
26                  <inTimecode>18:59:52;00</inTimecode>
27                  <outTimecode>18:59:56;00</outTimecode>
28                  <duration>00:00:04;00</duration>
29                  <effect> DISSOLVE </effect>
30                  <speed>100</speed>
31                  <audioLevel>0</audioLevel>
32          </scene>
33          <scene index="4">
34                  <coment>BALL IS FLYING TOWARD STANDS</coment>
35                  <source> CAMERA C </source>
36                  <inTimecode>18:59:56;00</inTimecode>
37                  <outTimecode>19:00:00;00</outTimecode>
38                  <duration>00:00:04;00</duration>
39                  <effect> DISSOLVE </effect>
40                  <speed>100</speed>
41                  <audioLevel>-3</audioLevel>
42          </scene>
                ...
                ...
    </digestTemplete>
```

INFORMATION PROCESSING APPARATUS, INFORMATION PROCESSING METHOD, INFORMATION PROCESSING PROGRAM, AND INFORMATION PROCESSING SYSTEM

BACKGROUND

The present disclosure relates to an information processing apparatus, an information processing method, an information processing program, and an information processing system, and more particularly, to an information processing apparatus, an information processing method, an information processing program, and an information processing system capable of allowing an editor to create a digest in a short time through an easy task.

In the related art, broadcast stations or program producing companies edit data (hereinafter, referred to as photographed materials), where photographed data obtained by photographing mainly sports as the objects are recorded, for a time from several minutes to several hours and deliver the data. During a series of these tasks, various types and shapes of apparatuses are used for the tasks, and a system including the apparatuses is generally referred to as a time differential delivery system. In the time differential delivery system, the editing and delivering of the photographed material are performed in parallel with the recording of the photographed material (refer to Japanese Unexamined Patent Application Publication No. 2010-11409 and Domestic Re-publication of PCT International Publication for Patent Application No. WO2007-004699.

In the case of creating a digest as a summary of a plurality of the photographed materials by using the time differential delivery system, an editor manually edits the photographed materials to create the digest. In other words, the editor previews the recorded photographed materials to search for a plurality of portions used for the digest and trims the corresponding portions. In addition, the editor appropriately adds visual effects every time the portions are trimmed and connects the visual effect-added portions to create the digest.

SUMMARY

However, for example, in a time interval of 1 minute or several minute from the time when the content of one round of a boxing match or one inning of a baseball game is recorded as a photographed material to the time when the next round or inning starts, the editor edits the photographed material to create the digest and delivers the digest. In this manner, in some cases, the time interval from the end of the recording the photographed material to the delivery of the digest may be as short as only several minutes. In order to create the digest in a short time, the associated task is very difficult even for a skilled editor.

It is desirable to allow an editor to create a digest in a short time through an easy task.

According to a first embodiment of the present disclosure, there is provided an information processing apparatus including: a receiving unit which receives event information capable of specifying a type of an event; a template acquiring unit which acquires a template of the event of the type specified by the event information received by the receiving unit as a template which becomes a source of an editing list of a plurality of scenes; an editing list creating unit which creates the editing list of the plurality of scenes based on the template acquired by the template acquiring unit; and a digest creating unit which creates data of the plurality of scenes included in the editing list created by the editing list creating unit from the one or more photographed materials acquired from another information processing apparatus and creates a digest by combining the created data of the plurality of scenes.

The information processing apparatus may further include a preview controller which allows a video of the digest to be previewed.

The information processing apparatus may further include an editing list updating unit which corrects and updates the editing list created by the editing list creating unit, wherein the digest creating unit creates the data of the plurality of scenes included in the editing list updated by the editing list updating unit from the one or more photographed materials acquired from the another information processing apparatus and creates the digest by combining the created data of the plurality of scenes.

The digest creating unit may create the editing list created by the editing list creating unit and the data of the plurality of scenes included in the editing list updated by the editing list updating unit from the one or more photographed materials acquired from the another information processing apparatus and create each digest by combining the created data of the plurality of scenes.

An information processing method and an information processing program according to the first embodiment of the present disclosure are a method and a program corresponding to the aforementioned information processing apparatus according to the first embodiment of the present disclosure.

In the information processing apparatus, the information processing method, and the information processing program according to the first embodiment of the present disclosure, event information capable of specifying a type of an event is received; a template of the event of the type specified by the event information received as a template which becomes a source of an editing list of a plurality of scenes is acquired; the editing list of the plurality of scenes is created based on the acquired template; data of the plurality of scenes included in the created editing list is created from the one or more photographed materials acquired from another information processing apparatus; and a digest is created by combining the created data of the plurality of scenes.

According to a second embodiment of the present disclosure, there is provided an information processing apparatus including: an event detecting unit which detects a photographed material including an event satisfying one or more conditions which are set in advance; an event information generating unit which generates event information capable of specifying a type of the event; and a transmitting unit which transmits the event information generated by the event information generating unit to another information processing apparatus.

The condition may be a predetermined keyword included in the audio of the photographed material.

The condition may be a condition that there is a predetermined instruction manipulation of a user, and when there is the predetermined instruction manipulation of the user with respect to a photographed material, the event detecting unit may determine that an event is included in the photographed material and detect the photographed material including photographed data corresponding to the event.

An information processing method and an information processing program according to the second embodiment of the present disclosure are a method and a program corresponding to the aforementioned information processing apparatus according to the second embodiment of the present disclosure.

In the information processing apparatus, the information processing method, and the information processing program according to the second embodiment of the present disclosure, a photographed material including an event satisfying one or more conditions which are set in advance is detected; event information capable of specifying a type of the event is generated; and the generated event information is transmitted to another information processing apparatus.

According to a third embodiment of the present disclosure, there is provided an information processing system including: a first information processing apparatus; and a second information processing apparatus, wherein the first information processing apparatus includes: an event detecting unit which detects a photographed material including an event satisfying one or more conditions which are set in advance; an event information generating unit which generates event information capable of specifying a type of the event; and a transmitting unit which transmits the event information generated by the event information generating unit to the second information processing apparatus, and wherein the second information processing apparatus includes: a receiving unit which receives the event information; a template acquiring unit which acquires a template of the event of the type specified by the event information received by the receiving unit as a template which becomes a source of an editing list of a plurality of scenes; an editing list creating unit which creates the editing list of the plurality of scenes based on the template acquired by the template acquiring unit; and a digest creating unit which creates data of the plurality of scenes included in the editing list created by the editing list creating unit from the one or more photographed materials acquired from another information processing apparatus and creates a digest by combining the created data of the plurality of scenes.

In the information processing system according to the third embodiment of the present disclosure, in the first information processing apparatus, the photographed material including the event satisfying one or more conditions which are set in advance is detected; the event information capable of specifying the type of the event is generated; and the generated event information is transmitted to the second information processing apparatus. In the second information processing apparatus, the event information is received; the template of the event of the type specified by the received event information as a template which becomes a source of the editing list of the plurality of scenes is acquired; the editing list of the plurality of scenes is created based on the acquired template; the data of the plurality of scenes included in the created editing list is created from the one or more photographed materials acquired from an other information processing apparatus; and the digest is created by combining the created data of the plurality of scenes.

As described above, according to the present disclosure, it is possible to allow an editor to create a digest in a short time through an easy task.

BRIEF DESCRIPTION OF THE DRAWINGS

FIG. 6 is a diagram illustrating a detailed example of an event detecting condition;

FIG. 8 is a diagram illustrating a detailed example of a template;

FIG. 9 is a diagram illustrating a detailed example of XML format data of a template;

FIG. 10 is a diagram illustrating a detailed example of corresponding information;

FIG. 12 is a diagram illustrating a detailed example of an editing list;

FIG. 14 is a block diagram illustrating an example of a hardware configuration of an information processing apparatus which the present disclosure is applied to.

DETAILED DESCRIPTION OF EMBODIMENTS

Example of Configuration of Time Differential Delivery System

Figure 1:
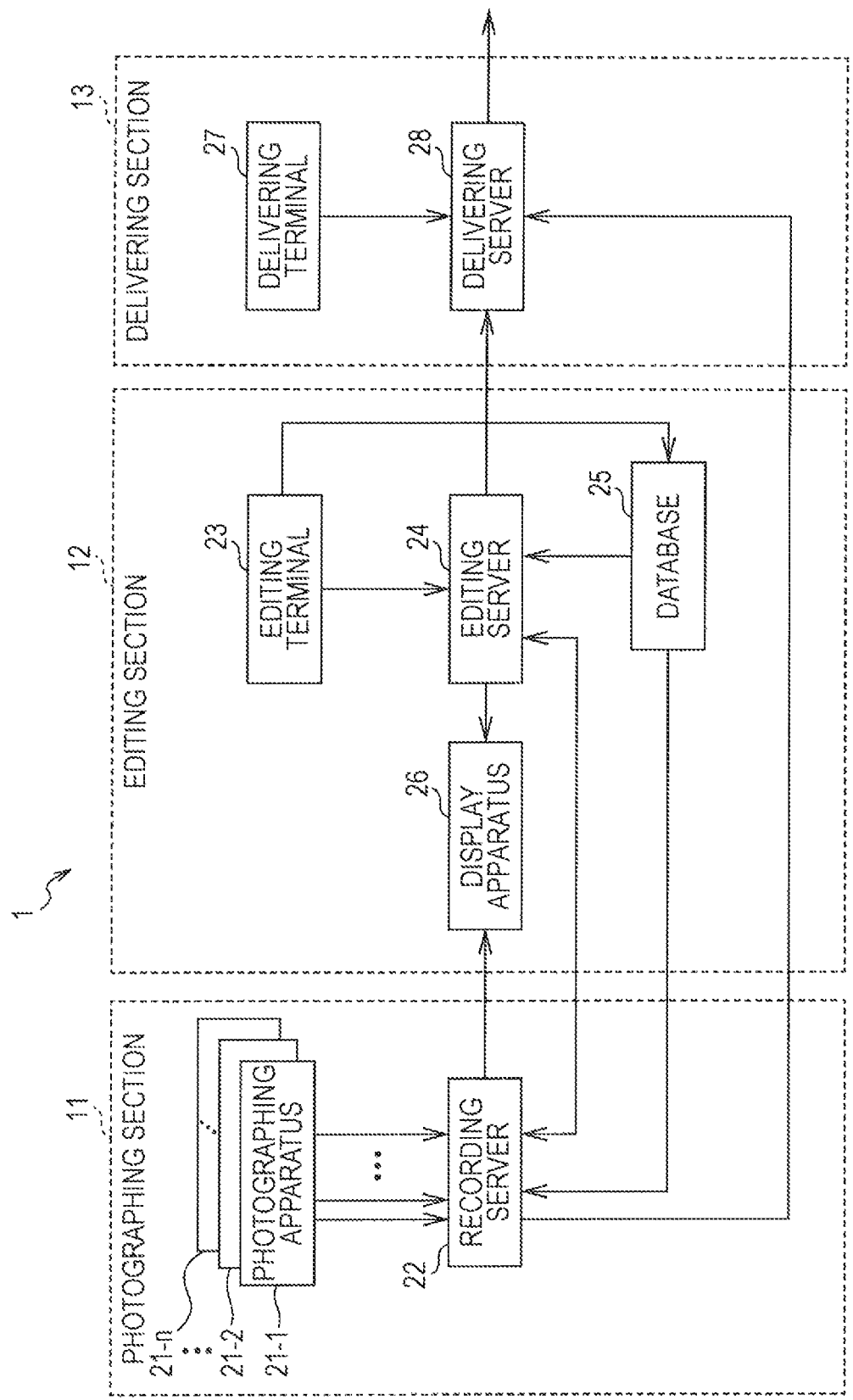
FIG. 1 is a block diagram illustrating an example of a configuration of a time differential delivery system.

FIG. 1 is a block diagram illustrating an example of a configuration of a time differential delivery system.

As illustrated in FIG. 1, the time differential delivery system 1 is configured with apparatuses installed in a photographing section 11, apparatuses installed in an editing section 12, and apparatuses installed in a delivering section 13.

The photographing section 11 is a section having a function of photographing a photographing target and recording photographed data obtained from the photographing as a photographed material. Photographing apparatuses 21-1 to 21-$n$ and a recording server 22 are installed in the photographing section 11 so as to perform the photographing or the recording. Hereinafter, in the case where individual photographing apparatuses 21-1 to 21-$n$ are not necessarily distinguished, the photographing apparatuses 21-1 to 21-$n$ are collectively referred to as a photographing apparatus 21. The photographing apparatus 21 performs radio communication by using infrared (IR) communication or the like to transmit the photographed data to the recording server 22. In addition, the recording server 22 performs communication with an editing server 24, a database 25, and a display apparatus 26 of the editing section 12 described later, and a delivering server 28 of the delivering section 13 by using cables, LAN (Local Area Network), IR communication, or the like, so that these apparatuses receive and transmit various types of information.

The photographing apparatus 21 photographs a photographing target and transmits the photographed data obtained as a result of the photographing to the recording server 22 by using radio communication.

The recording server 22 records the received photographed data as a photographed material and transmits the photographed data to the display apparatus 26 of the editing section 12 and the delivering server 28 of the delivering section 13. In addition, the recording server 22 detects an event from the photographed material. The event denotes a content included in the photographed material, that is, a specific event such as an important motion of a subject among a collection of events occurring in a real 3D space which is a photographing target. For example, in a baseball game as a photographed material, since the ball or players often become the subjects in many cases, when a batter hits a home run, a motion (hereinafter, simply referred to as a "home run") of a player such as a pitcher or a motion of the ball is detected as an event by the recording server 22. The recording server 22 transmits the information (hereinafter, referred to as event information) on the event such as the type of the detected event to the editing server 24 of the editing section 12 described later.

The editing section 12 is a section having a function of creating a digest of the event, which is specified by the event information, by acquiring the necessary photographed material from the photographing section 11 and editing the photographed material if the event information is received from the photographing section 11. An editing terminal 23, an editing server 24, a database 25, and a display apparatus 26 are installed in the editing section 12 so as to perform the creation of the digest. The editing terminal 23 receives and transmits various types of information from and to the editing server 24 and the database 25 through cables or the like. The editing server 24 also receives and transmits various types of information from and to the database 25 and the display apparatus 26 through cables or the like. In addition, the editing server 24 performs communication with the delivering server 28 of the delivering section 13 described later by using cables, a LAN, IR communication, or the like, so that the editing server 24 transmits various types of information.

The editing terminal 23 creates editing conditions used for the creation of the digest according to the input manipulation of the editor and registers the editing conditions in the database 25. For example, in the embodiment, a digest template, a condition for detecting the occurrence of an event (hereinafter, referred to as an event detecting condition), and corresponding information between the event information and the template are employed as the editing conditions.

The editing server 24 receives the event information from the recording server 22 of the photographing section 11 and recognizes the type of the event from the event information. Next, the editing server 24 acquires the template corresponding to the type of the event by referring to the corresponding information registered in the database 25. Next, the editing server 24 creates the editing list of the digest by using the acquired template and creates the digest from the photographed material acquired from the recording server 22 according to the created editing list. Next, the editing server 24 transmits the created digest and the created editing list to the delivering server 28 of the delivering section 13 described later.

The database 25 stores the digest template, the event detecting condition, and the corresponding information with respect to each of the types of the event.

The display apparatus 26 previews the photographed material received from the recording server 22 of the photographing section 11 and the digest created by the editing server 24.

The delivering section 13 is a section having a function of delivering the digest received from the editing section 12. A delivering terminal 27 and a delivering server 28 are installed in the delivering section 13 so as to perform the delivery of the digest. The delivering terminal 27 transmits and receives various types of information through the delivering server 28, cables, and the like.

The delivering server 28 receives the digest and the editing list from the editing server 24 of the editing section 12 and stores the digest and the editing list. In addition, the delivering server 28 creates the digest from the photographed material received from the recording server 22 of the photographing section 11 according to the editing list. The delivering terminal 27 instructs the delivering server 28 to perform the selection of the to-be-delivered digest, the digest delivering timing, and the like according to the input manipulation of the delivering instruction from the editor. The delivering server 28 delivers the digest according to the delivering instruction.

In addition, in the embodiment, in the case of processing the data of a moving picture, each apparatus performs the process in units of a field or a frame. Hereinafter, this unit is referred to as a unit image. In other words, in the embodiment, a moving picture is considered to be constructed with a plurality of the unit images. However, hereinafter, for the convenience of description, the unit image is described to be a frame.

Next, examples of functional configurations of the time differential delivery system 1 will be described with reference to FIGS. 2 to 4.

[Examples of Functional Configurations of Components of Time Differential Delivery System 1]

Figure 2:
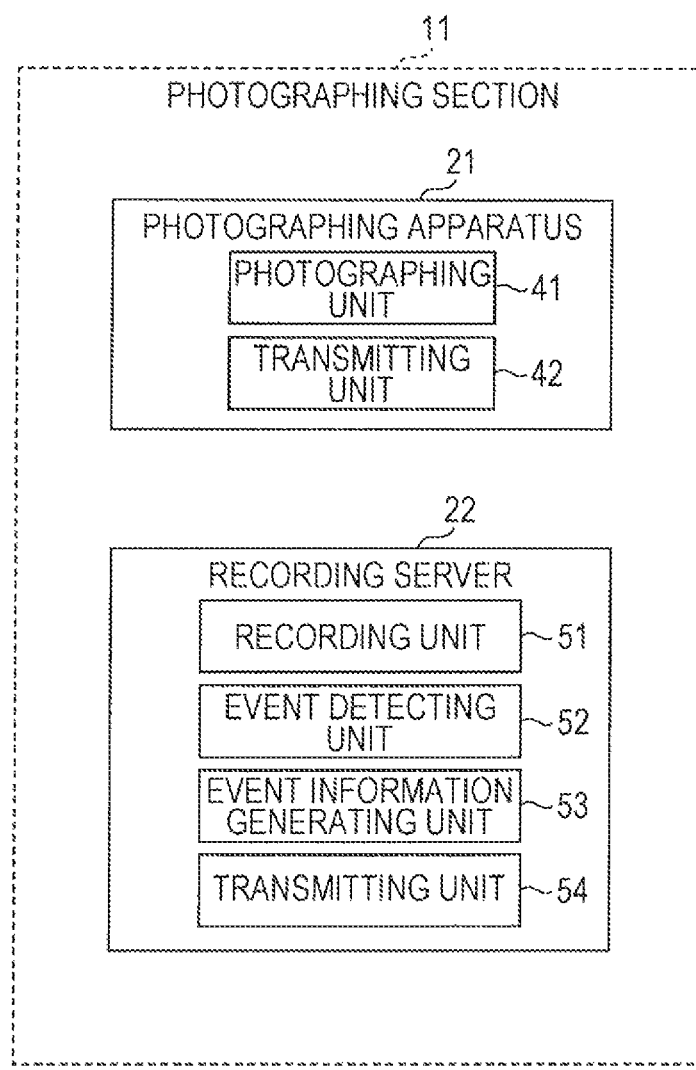
FIG. 2 is a block diagram illustrating an example of a functional configuration of apparatuses installed in a photographing section.
Figure 3:
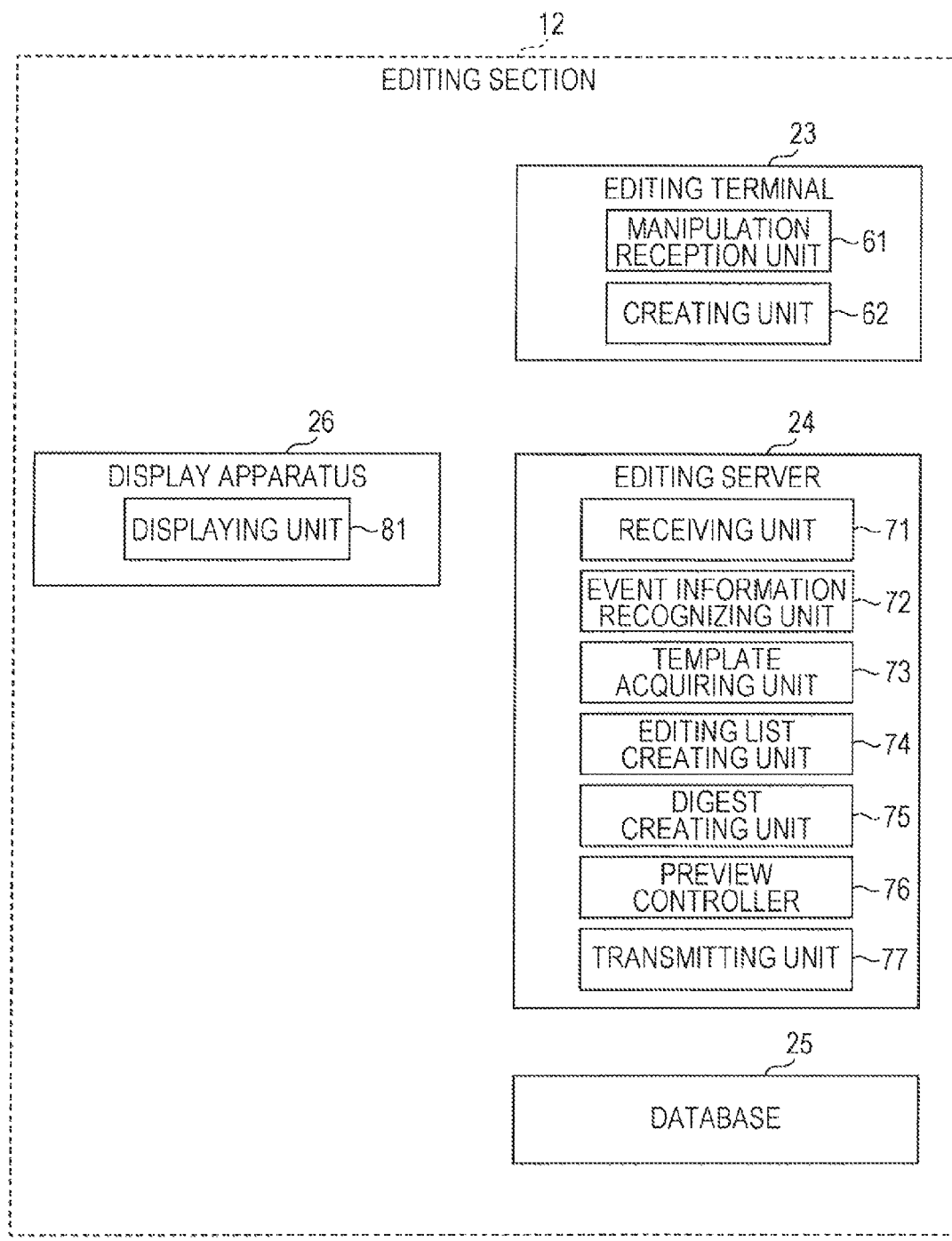
FIG. 3 is a block diagram illustrating an example of a functional configuration of apparatuses installed in an editing section.
Figure 4:
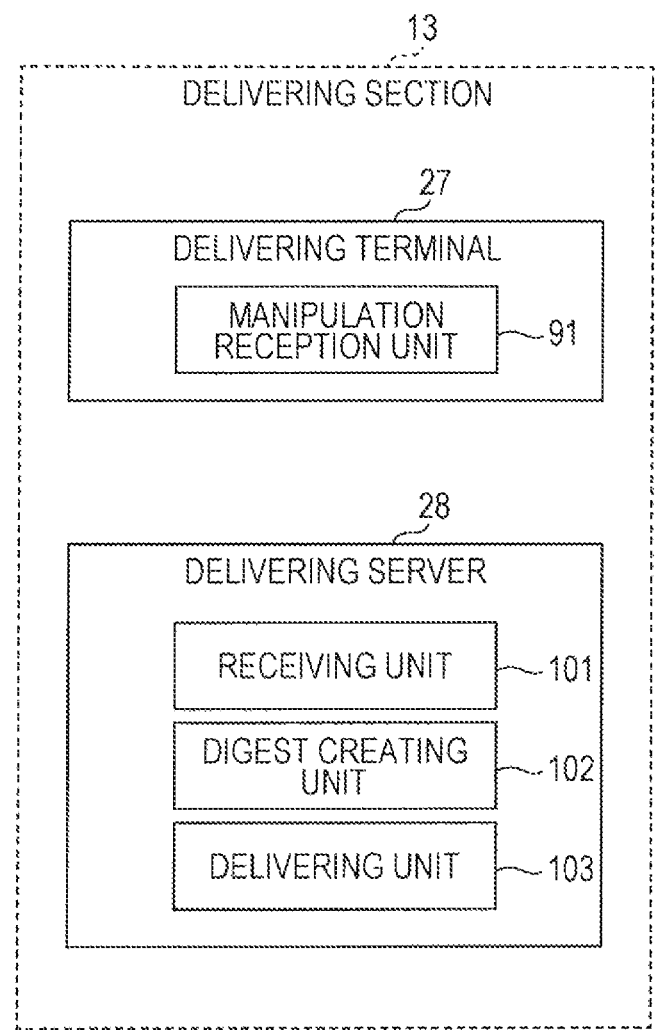
FIG. 4 is a block diagram illustrating an example of a functional configuration of apparatuses installed in a delivering section.

FIGS. 2 to 4 are block diagrams illustrating examples of functional configurations of components constituting the time differential delivery system 1.

FIG. 2 is a block diagram illustrating an example of a functional configuration of the apparatuses installed in the photographing section 11.

The photographing apparatus 21 includes a photographing unit 41 and a transmitting unit 42.

The photographing unit 41 photographs a photographing target and outputs the photographed data obtained from a result of the photographing.

The transmitting unit 42 transmits the photographed data output from the photographing unit 41 to the recording server 22.

The recording server 22 includes a recording unit 51, an event detecting unit 52, an event information generating unit 53, and a transmitting unit 54.

The recording unit 51 sequentially receives the photographed data which are sequentially transmitted from the transmitting unit 42 and sequentially records the photographed data of a predetermined time interval as one photographed material. The predetermined time interval is not particularly limited but it may be arbitrarily set. Herein, for the convenience of description, the predetermined time interval is set to 1 second.

The event detecting unit 52 detects the photographed material including the photographed data corresponding to the event by determining whether or not each of the photographed materials recorded by the recording unit 51 satisfies the event detecting condition. A detailed example of the event detecting condition is described later with reference to FIG. 6.

The event information generating unit 53 generates the event information capable of specifying the type of the event which is detected by the event detecting unit 52.

The transmitting unit 54 transmits each of the photographed materials to the display apparatus 26 of the editing section 12 and the delivering server 28 of the delivering section 13. In addition, the transmitting unit 54 transmits the event information generated by the event information generating unit 53 to the editing server 24 of the editing section 12.

FIG. 3 is a block diagram illustrating an example of a functional configuration of apparatuses installed in the editing section 12.

The editing terminal 23 includes a manipulation reception unit 61 and a creating unit 62.

The manipulation reception unit 61 receives various types of instructions by the input manipulation of the editor.

The creating unit 62 creates various types of editing conditions based on the various types of instructions received by the manipulation reception unit 61 and registers the various types of the editing conditions in the database 25.

For example, in the embodiment, the digest template, the event detecting condition, and the corresponding information are employed as the editing conditions which are objects of the creation or correction by the creating unit 62. Although described later in detail, the digest template is data which become the source of the editing list used for the creation of the digest. The event detecting condition is a condition for detecting the occurrence of an event. The corresponding information is information indicating a correspondence relationship between the type of the event and the template. In addition, further details of the digest template and the corresponding information are described later with reference to FIGS. 8 to 10.

For example, the editor performs a predetermined input manipulation on the editing terminal 23 to perform an instruction for asking whether or not each of the editing conditions is registered. If the manipulation reception unit 61 receives this instruction, the manipulation reception unit 61 determines whether or not each of the editing conditions is registered. The creating unit 62 creates the editing condition, which is determined not to be registered in the manipulation reception unit 61, so as to be a new editing condition and registers the editing condition in the database 25.

In addition, for example, the editor may perform a predetermined input manipulation on the editing terminal 23 to instruct the correction of the editing list. Although described later in detail, the editing list is data used for the creation of the digest. If the manipulation reception unit 61 receives this instruction, the manipulation reception unit 61 notifies the instructed content to the editing list creating unit 74 described later. The editing list creating unit 74 creates the editing list based on the instructed content notified from the manipulation reception unit 61.

In addition, for example, a CG (Computer Graphics) image may be used for the digest. Although described later in detail, for example, the CG image may be used for score display of a baseball game. The editor may perform a predetermined input manipulation on the editing terminal 23 to perform various necessary instructions used for the creation of the CG image. If the manipulation reception unit 61 receives this instruction, the manipulation reception unit 61 notifies the instructed content to the creating unit 62. The creating unit 62 creates the CG image based on the instructed content notified from the manipulation reception unit 61.

The editing server 24 includes a receiving unit 71, an event information recognizing unit 72, a template acquiring unit 73, an editing list creating unit 74, a digest creating unit 75, a preview controller 76, and a transmitting unit 77.

The receiving unit 71 sequentially acquires the event information corresponding to each of the photographed materials of a predetermined time interval, for example, 1 second (30 frames), which are sequentially transmitted from the recording server 22 of the photographing section 11.

The event information recognizing unit 72 recognizes the type of the event from the event information received by the receiving unit 71.

The template acquiring unit 73 acquires the template corresponding to the type of the event recognized by the event information recognizing unit 72 with reference to the corresponding information registered in the database 25.

The editing list creating unit 74 creates the editing list of the digest by using the template acquired by the template acquiring unit 73. In addition, in the case where the correction of the editing list is instructed, the editing list creating unit 74 corrects a problematic portion in the editing list and updates the editing list.

The digest creating unit 75 creates the digest from the photographed materials acquired from the recording server 22 according to the editing list created by the editing list creating unit 74.

The preview controller 76 performs control of previewing the digest created by the digest creating unit 75 on the display apparatus 26. In addition, the preview controller 76 performs control of previewing the photographed materials received from the recording server 22 on the display apparatus 26.

The transmitting unit 77 transmits the editing list created by the editing list creating unit 74 and the digest created by the digest creating unit 75 to the delivering section 13.

The displaying unit 81 displays a moving picture corresponding to the photographed material of a predetermined time interval, that is, 1 second, which is received from the photographing section 11, under the control of the preview controller 76. In addition, the displaying unit 81 displays the digest under the control of the preview controller 76. The editor checks the photographed material and the digest displayed on the displaying unit 81; and in the case where the correction of the editing list is determined to be necessary, the editor performs an input manipulation on the editing terminal 23 to instruct the changing of the editing list.

FIG. 4 is a block diagram illustrating an example of a functional configuration of apparatuses installed in the delivering section 13.

The delivering terminal 27 includes a manipulation reception unit 91. The delivering server 28 includes a receiving unit 101, a digest creating unit 102, and a delivering unit 103.

The manipulation reception unit 91 instructs the delivering server 28 to perform the selection of the to-be-delivered digest, the digest delivering timing, or the like according to the input manipulation of the delivering instruction from the editor. The receiving unit 101 receives the digest and the editing list from the editing section 12. In addition, the receiving unit 101 receives the photographed material from the photographing section 11. The digest creating unit 102 creates the digest from the photographed material according to the editing list. The delivering unit 103 delivers the digest according to the delivering instruction received by the manipulation reception unit 91. In addition, in some cases, the delivering unit 103 may deliver the photographed material received from the photographing section 11 as it is according to the delivering instruction received by the manipulation reception unit 91.

Next, the processes of the components of the time differential delivery system 1 having the aforementioned functional configuration are described with reference to FIGS. 5 to 13. The process of the time differential delivery system 1 is a collection of the processes of the sections. The process of each section is independent of the processes of other sections, and in some cases, these processes may be simultaneously performed. However, if a predetermined photographed material is focused on, and the processes are viewed in terms of a flow of the corresponding photographed material, the processes are performed in the order of the photographing section 11, the editing section 12, and the delivering section 13. Therefore, hereinafter, a flow of the processes will be described in the order of the photographing section 11, the editing section 12, and the delivering section 13.

First, a flow of a process (hereinafter, referred to as a photographing process) of the photographing section 11 is described.

[Photographing Process]

Figure 5:
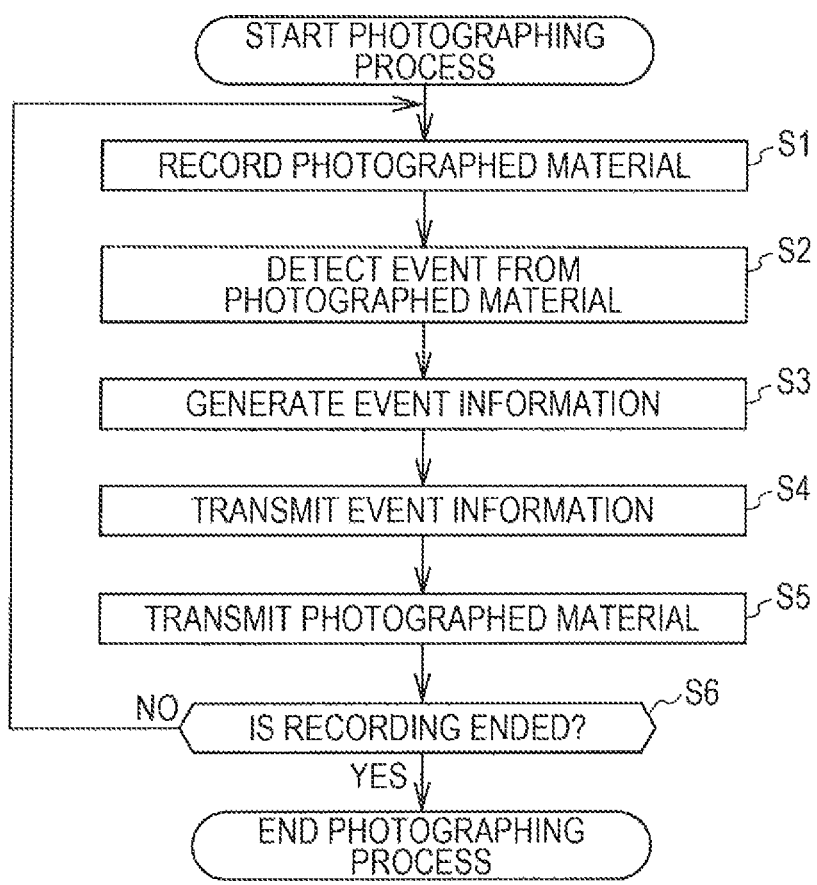
FIG. 5 is a flowchart illustrating a flow of a photographing process.

FIG. 5 is a flowchart illustrating a flow of the photographing process of the photographing section 11.

However, the photographing process of FIG. 5 is a process indicated in terms of the recording server 22. Therefore, the photographing unit 41 of the photographing apparatus 21 photographs a photographing target and starts to transmit the photographed data obtained as a result of the photographing to the recording server 22, and the photographing process of FIG. 5 is performed by using the start of the transmission as a trigger.

In Step S1, the recording unit 51 records the data of a predetermined time interval, that is, the data of one second in this case among the photographed data, which are sequentially transmitted from the photographing apparatus 21, as the one photographed material. Therefore, the processes of the next Step S2 and following steps are performed on the photographed material.

In Step S2, the event detecting unit 52 detects the event from the photographed material recorded in the process of Step S1. In the process of Step S2 of the embodiment, in the event detection, the event detecting condition registered in the database 25 of the editing section 12 is referred to.

Herein, a detailed example of the event detecting condition is described with reference to FIG. 6.

[Event Condition]

FIG. 6 is a diagram illustrating a detailed example of the event detecting condition.

FIG. 6 illustrates an example of the event detecting condition in the case where the photographed material is a baseball game and the event is a "Home Run".

In the example of FIG. 6, the event detecting conditions are included in a table having a matrix structure. The table includes items of "Condition Number", "Target Material", "Classification", "Detailed Condition", and "Comment" in the column direction. In addition, one row of the table is configured to be associated with one event detecting condition. In other words, in the one row of the table, the event detecting conditions associated with the corresponding one row are specified by the contents stored in the items of "Condition Number", "Target Material", "Classification", "Detailed Condition", and "Comment".

In the example of FIG. 6, n (n is an integer value of 2 or more) event conditions exist, and one of the numbers of 1 to n is attached to each of the n event conditions. Hereinafter, the number is referred to as a condition number. Since the condition number is a number for uniquely specifying the event condition, it is not permitted that the same number is attached to a plurality of the event conditions. The item which the condition number is stored in is included as "Condition Number" in the table of FIG. 6. In other words, the condition number which uniquely specifies the event condition associated with the corresponding row is stored in the item of "Condition Number" of a predetermined row.

The information for specifying the photographed material as the target of the event detection performed by the event detecting unit 52 by using the event condition associated with the corresponding row is stored in the item of "Target Material" of a predetermined row of the table of FIG. 6. In the embodiment, as this information, the name of the photographing apparatus 21 is stored in the item of "Target Material". In other words, in the case where the event detection from the photographed material where the photographed data of the photographing apparatus 21, of which the name is stored in "Target Material" of a predetermined row, is recorded is performed by the event detecting unit 52, the event condition associated with the corresponding row is used. In addition, in the example illustrated in FIG. 6, each of the names of the photographing apparatuses 21 is denoted by camera K (K is a predetermined letter).

The information for specifying whether the target of the event detection performed by the event detecting unit 52 are the audio data or the image data by using the event condition associated with the corresponding row is stored in the item of "Classification" of a predetermined row of the table of FIG. 6. In the embodiment, as the information, "Audio" indicating that the target is audio data or "Image" indicating that the target is image data is stored in the item of "Classification".

Herein, as well as data of an image obtained as a result of the photographing of a subject, data of surrounding sounds at the time of obtaining the moving picture are also included in the photographed data of the photographing apparatus 21 and the recorded photographed material. Therefore, in the case where the "Audio" is included in the "Classification" of a predetermined row, the event detecting unit 52 determines based on the audio data included in the photographed material specified by the "Target Material" of the corresponding row whether or not the event condition associated with the corresponding row is satisfied. On the contrary, in the case where the "Image" is included in the "Classification" of a predetermined row, the event detecting unit 52 determines based on the image data included in the photographed material specified by the "Target Material" of the corresponding row whether or not the event condition associated with the corresponding row is satisfied.

The detailed content of the event condition associated with the corresponding row is stored in the predetermined item of "Detailed Condition" of the table of FIG. 6. Therefore, the event detecting unit 52 analyzes the audio data or the image data which are specified by "Target Material" and "Classification" of a predetermined row and compares the result of the analysis and the content stored in the item of "Detailed Condition" of the corresponding row. Next, the event detecting unit 52 determines based on the result of the comparison whether or not the event condition associated with the corresponding row (the event condition specified by the value stored in the "Condition Number" of the corresponding row) is satisfied. For example, the keyword "Home Run" in the row of the condition number "1" and the keyword "flying into the stands" in the row of the condition number "2" are considered to be "Detailed Conditions".

The additional information on the event condition associated with the corresponding row, that is, description or the like is stored in the predetermined item of "Comment" of the table of FIG. 6.

For example, as the event detecting condition associated with the 1st row, the event detecting condition of the condition number "1" denotes the following condition. In other words, in the case where the data of "Audio" among the photographed material obtained from the photographed data of "Camera M" is set as a target and a keyword "Home Run" included in the corresponding "Audio", the condition indicating that the photographed material including the "Audio" includes an event is the event detecting condition of the condition number "1". In other words, as stored in the item of "Comment" of the 1st row, the condition "it is detected through the audio analysis that a keyword "Home Run" is issued" is the event detecting condition of the condition number "1".

For example, as the event detecting condition associated with the 2nd row, the event detecting condition of the condition number "2" denotes the following condition. In other words, in the case where the data of "Audio" among the photographed material obtained from the photographed data of "Camera M" is set as a target and a keyword "flying into the stands" included in the corresponding "Audio", the condition indicating that the photographed material including the "Audio" includes an event is the event detecting condition of the condition number "2". In other words, as stored in the item of "Comment" of the 2nd row, the condition "it is detected through the audio analysis that the keyword "flying into the stands" is issued" is the event detecting condition of the condition number "2".

For example, as the event detecting condition associated with the 3rd row, the event detecting condition of the condition number "3" denotes the following condition. In other words, in the case where the data of "Image" among the photographed material obtained from the photographed data of "Camera C" is set as a target and an image of "the ball is flying into the stands" included in the corresponding "Image", the condition indicating that the photographed material including the "Image" includes an event is an event is the event detecting condition of the condition number "3". In other words, as stored in the item of "Comment" of the 3rd row, the condition "it is detected through the image analysis that the ball is flying into the stands" is the event detecting condition of the condition number "3".

For example, as the event detecting condition associated with the 4th row, the event detecting condition of the condition number "4" denotes the following condition. In other words, in the case where the data of "Audio" among the photographed material obtained from the photographed data of "Camera K" is set as a target and an audio "Large cheers come" included in the corresponding "Audio", the condition indicating that the photographed material including the "Audio" is an event is the event detecting condition of the condition number "4". In other words, as stored in the item of "Comment" of the 4th row, the condition "it is detected through the audio analysis that large cheers come from the stands" is the event detecting condition of the condition number "4".

Herein, although the event detecting conditions of the condition numbers "1" to "n" may be individually used, these conditions may be used in combination so as to improve the accuracy of the event detection. A method of combining the event detecting conditions of the condition numbers "1" to "n" is not particularly limited, but they may be arbitrarily combined. In the embodiment, the combination of the event detecting conditions of the condition numbers "1" to "n" is expressed by a logical formula, and the combination of the event detecting conditions of the condition numbers "1" to "n" may be changed by variably setting the logical formula.

In the embodiment, as the item describing this logical formula, the item of "Conditional Sentence" is attached to the table of FIG. 6. For example, in the example of FIG. 6, a logical formula "(1)×(2)+(3×4)+..." is written in the item of "Conditional Sentence". This denotes that, in the case where the event detecting conditions of "condition numbers "1" and "2" are satisfied or the case where the condition number 3 or the condition number 4 is satisfied...", the event is detected. In this manner, a plurality of the conditions corresponding to the condition numbers are combined as an operand by a theoretical equation, so that it is possible to increase the accuracy of the event detection.

In this manner, as the item indicating the condition for detecting the occurrence of the event, the item indicating "Conditional Sentence" is attached. In addition, as the item indicating the type of the to-be-detected event, the item indicating "Event Name" is attached to the event detecting condition.

Returning to the description of the flowchart of FIG. 5, if the event detection based on the event detecting condition included in the table of FIG. 6 or the like is ended in the process of Step S2, the process proceeds to Step S3.

In Step S3, the event information generating unit 53 generates the event information capable of specifying the type of the event detected in Step S2. For example, if the type of the event detected in Step S2 is "Home Run", the event information capable of specifying the "Home Run" is generated.

In Step S4, the transmitting unit 54 transmits the event information corresponding to the photographed material of a predetermined time interval, that is, the photographed material of 1 second in this case to the editing section 12.

In Step S5, the transmitting unit 54 transmits the photographed material of a predetermined time interval, that is, the photographed material of 1 second in this case to the display apparatus 26 of the editing section 12 and the delivering section 13.

In Step S6, the recording unit 51 determines whether or not the recording is ended.

In the case where the photographed data are still transmitted from the photographing apparatus 21, NO is determined in Step S6, and the process returns to Step S1, so that the following processes are repeated. In other words, during the transmission of the photographed data from the photographing apparatus 21, the looping process of Steps S1 to S6 is repetitively performed several times. Therefore, in the case where the event is detected several times, a plurality of the event information are transmitted to the editing section 12. In addition, in some cases, the same type of the events may be detected by the circuits, and in other cases, different types of the events may be detected.

After that, the transmission of the photographed data from the photographing apparatus 21 is ended. If the process of Steps S1 to S5 are performed on the photographed material recorded from the finally-transmitted photographed data, YES is determined in the next Step S6, and the photographing process is ended.

In addition, in the process of Step S2 of the photographing process of FIG. 5, the event detecting unit 52 detects the event from the photographed material by referring to the event detecting condition. However, the method of the event detection is not limited thereto. For example, the method may be employed so that the editor is allowed to check the video or audio of the photographed material previewed on the display apparatus 26; when the editor recognizes that the event occurs, the editor is allowed to perform a predetermined input manipulation on the editing terminal 23; and when the input manipulation is received, the event is detected.

In the photographing section 11, the photographing process illustrated in FIG. 5 is performed, and in the editing section 12, before the creation of the digest of the photographed material, the editing terminal 23 performs a series of process up to the time when various editing conditions is registered in the database 25. Hereinafter, a series of processes of the editing terminal 23 are referred to as an editing condition creating process.

[Editing Condition Creating Process]

Figure 7:
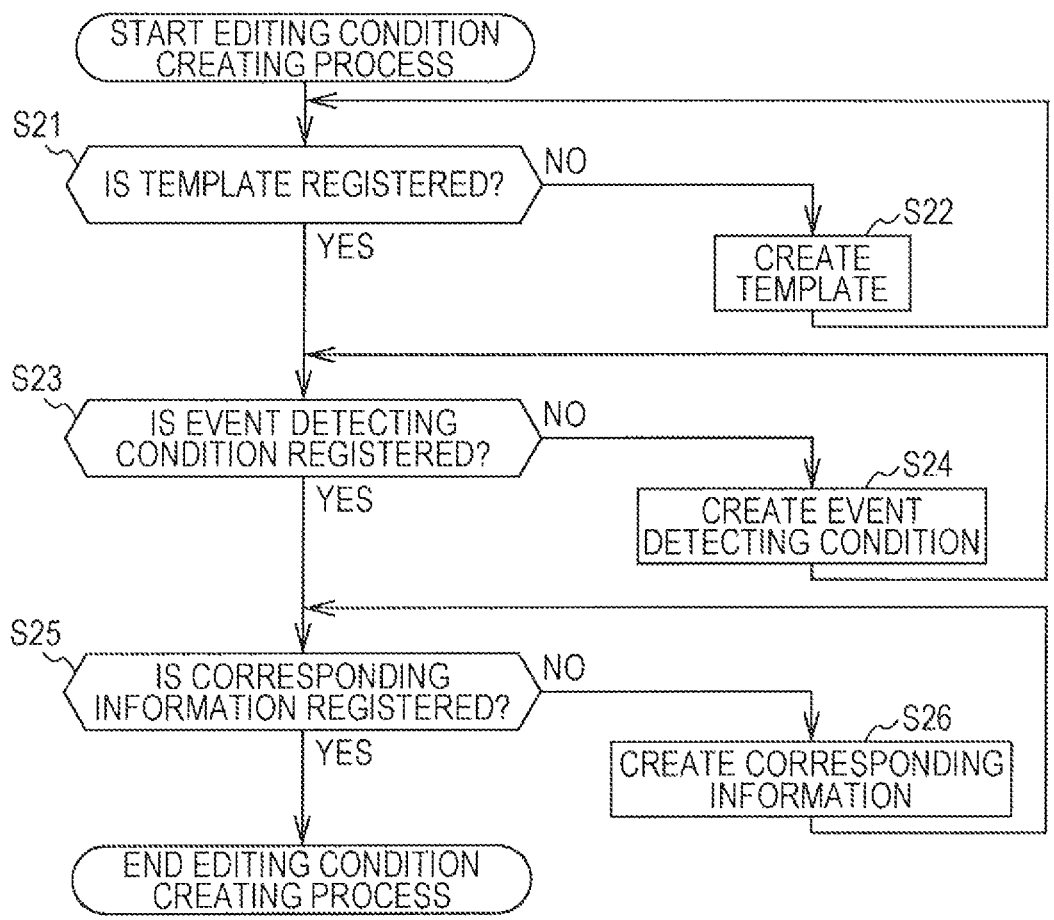
FIG. 7 is a flowchart illustrating a flow of an editing condition setting process.

FIG. 7 is a flowchart illustrating a flow of the editing condition creating process of the editing terminal 23.

In Step S21, the manipulation reception unit 61 receives the input manipulation of the editor and determines whether or not the template is registered in the database 25.

Herein, a detailed example of the template is described with reference to FIGS. 8 and 9.

[Template of Digest]

FIG. 8 is a diagram illustrating a detailed example of the template.

FIG. 8 illustrates an example of the template in the case where the content of the photographed material is a baseball game and the type of the event is "Home Run".

In the example of FIG. 8, the template is registered as a table having a matrix structure in the database 25. This table includes items of "Scene Number", "Comment", "Material", "In Point", "Out Point", "Duration", "Effect", "Speed (%)", and "AudioLevel (db)" in the column direction. In addition, one row of the table is configured to be associated with one scene.

The scene denotes a collection of events in a portion of the interval among a collection of events (baseball game or the like) occurring in a real 3D space expressed by photographed materials. The duration of the portion of the interval is not particularly limited. The time length may be longer or shorter than a processing unit of a photographed material, that is, in this case, 1 second. In other words, in some cases, the data of the scene may be included as a photographed material of 1 second unit; and in other cases, the data of the scene may be configured with a plurality of photographed materials. For example, the scene of home run denotes a collection of events including an event of a pitcher pitches a ball, an event that a batter hits the ball, an event that the ball is flying into the stands, and all the events up to the event that the batter circles all the bases as a result of the hitting. In this case, the scene of home run is constructed with a plurality of detailed unit scenes including the scene indicating the pitcher pitches the ball, the scene indicating that the batter hits the ball, the scene indicating that the ball is flying into the stands, the scene indicating that the batter circles all the bases, and the like. In the table illustrated in FIG. 8, the types of the detailed unit scenes are listed to be associated with the rows. In addition, as one of the detailed unit scenes, a type which is not a photographed material itself but configured with a CG image may be employed (refer to a type of the scene number "9" described later).

In other words, in the one row of the template, the template associated with the corresponding one row is specified by the contents stored in the items of "Scene Number", "Comment", "Material", "In Point", "Out Point", "Duration", "Effect", "Speed (%)", and "AudioLevel (db)".

In addition, as the item indicating the type of the template, the item indicating "Template Name" is attached to the template. In addition, as the item indicating the update date of the template, the item indicating "Update Date" is attached thereto.

In the example of FIG. 8, 10 types of scenes exist, and one of the numbers of 1 to 10 is attached to each of the 10 types of the scenes. Hereinafter, the number is referred to as a scene number. Since the scene number is a number for uniquely specifying the scene, it is not permitted that the same number is attached to a plurality of the types of the scenes. The item which the scene number is stored in is included as "Scene Number" in the table of FIG. 8. In other words, the scene number which uniquely specifies the type of the scene associated with the corresponding row is stored in the item of "Scene Number" of a predetermined row.

A summary of the type of the scene associated with the corresponding row is written in the item of "Comment" of a predetermined row of the table of FIG. 8. An arbitrary character line input by the editor may be stored in the item of "Comment".

The information for specifying the one or more photographed materials constituting the type of the scene associated with the corresponding row is stored in the item of "Material" of a predetermined row of the table of FIG. 8. In the embodiment, as this information, the name of the photographing apparatus 21 is stored in the item of "Material". In other words, the data of the scene of the type associated with the corresponding row is configured with the one or more photographed materials recorded from the photographed data of the photographing apparatus 21 of which the name is stored in "Material" of a predetermined row. In addition, in the example of FIG. 8, so as to correspond to the example of FIG. 6, each of the names of the photographing apparatuses 21 is denoted by camera K (K is a predetermined letter). However, as illustrated in the 9th row, the type of the scene may be configured with the data of a CG image instead of the photographed material.

The time code indicating the starting time point of the scene of the type associated with the corresponding row is written in the item of "In Point" of a predetermined row of the table of FIG. 8. The time code is a display time point of each of the frames attached to data of frames constituting photographed data (that is, the one or more photographed materials) and is configured to be arranged in the order of hour, minute, second, and frame number. Herein, a reference time point "00:00:00;00" of a display time point of a frame is a predefined time point, and in the embodiment, the time point of the event detection is employed.

For example, in the case where the frame rate of the photographed data is 30 frames/second, the time code is expressed by "hour:minute:second; frame number X" (X is an integer of 0≤X≤29). For example, in the case where the time code is "00:01:10;25", among the photographed data, the display time point of the frame which is the 25th frame at 00 hour 01 minute 10 seconds indicates the starting time point of the scene of the type associated with the corresponding row. In addition, in the description hereinafter, for simplifying the description, the description of the frame number is omitted. In addition, the preceding time point of the event detection time is expressed by the symbol "−" written in front of the time code. For example, "−00:00:15;00" denotes the time point by 15 seconds prior to the event detection time.

The time code indicating the ending time point of the scene of the type associated with the corresponding row is written in the item of "Out Point" of a predetermined row of the table of FIG. 8. In this case, the reference time point of the display time point of the frame "00:00:00;00" is the same as that of the case of "In Point", and in the embodiment, the reference time point is set to the time point of the event detection.

The difference time interval in the time code between the In Point and the Out Point is written in the item of "Duration" of a predetermined row of the table of FIG. 8. In other words, the duration of the scene is written in the item of "Duration".

The visual effect added between the scene of the type associated with the corresponding row and the next scene is written in the item of "Effect" of a predetermined row of the table of FIG. 8. In other words, for example, cuts, wipes, dissolves, or the like are written in the item of "Effect".

The reproduction speed of the scene of the type associated with the corresponding row, as a relative value by setting the original reproduction speed of the photographed material constituting the scene to "100%", is written in the item of "Speed (%)" of a predetermined row of the table of FIG. 8. For example, in the case where "Speed (%)" is "200%", the reproduction speed of the scene is double the original reproduction speed of the photographed material constituting the scene; and in the case where "Speed (%)" is "50%", the reproduction speed of the scene is 0.5 times the original reproduction speed.

The sound volume of the audio data of the scene of the type associated with the corresponding row, as a relative value by setting the sound volume of the original audio data of the photographed material constituting the scene to "0", is written in the item of "AudioLevel (db)" of a predetermined row of the table of FIG. 8. For example, in the case where "AudioLevel (db)" is "2", the sound volume of the audio data of the scene is larger than the sound volume of the original audio data of the photographed material constituting the corresponding scene; and in the case where "AudioLevel (db)" is "3", the sound volume of the audio data of the scene is much larger than that of the case where "AudioLevel (db)" is "2". On the other hand, in the case where "AudioLevel (db)" is "−1", the sound volume of the audio data of the scene is smaller than the sound volume of the original audio data of the photographed material constituting the corresponding scene, and in the case where "AudioLevel (db)" is "−2", the sound volume of the audio data of the scene is much smaller than that of the case where "AudioLevel (db)" is "−1".

For example, the scene associated with the 1st row, that is, the scene of the scene number "1" is "Pitcher is pitching ball" scene and is configured with the following photographed materials. In other words, among the photographed materials of the "Camera E", the scene of the scene number "1" is configured with the photographed materials of "00:00:05;00" for five seconds from "−00:00:15;00" by 15 seconds prior to "00:00:00;00" of the event detection time to "−00:00:10;00" by 10 seconds prior to "00:00:00;00" of the event detection time. Next, the visual effect of "Dissolve" is added between the scene of the scene number "1" and the next scene of the scene number "2". In addition, with respect to the scene of the scene number "1", the reproduction speed thereof is set to "100%" indicating that the reproduction speed is equal to the original reproduction speed of the photographed material used for the corresponding scene, and the sound volume of the audio data there is set to "0" indicating that the sound volume of the audio data is equal to the sound volume of the original audio data of the photographed material used for the scene.

The scene associated with the 2nd row, that is, the scene of the scene number "2" is "Hit" scene and is configured with the following photographed materials. In other words, among the photographed materials of the "Camera B", the scene of the scene number "2" is configured with the photographed materials of "00:00:03;00" for three seconds from "−00:00:10;00" by 10 seconds prior to "00:00:00;00" of the event detection time to "−00:00:07;00" by 7 seconds prior to "00:00:00;00" of the event detection time. Next, the visual effect of "Dissolve" is added between the scene of the scene number "2" and the next scene of the scene number "3". In addition, the scene of the scene number "2", the reproduction speed thereof is set to "100%" indicating that the reproduction speed is equal to the original reproduction speed of the photographed material used for the corresponding scene, and the sound volume of the audio data there is set to "0" indicating that the sound volume of the audio data is equal to the sound volume of the original audio data of the photographed material used for the scene.

The scene associated with the 3rd row, that is, the scene of the scene number "3" is "Pitcher Up" scene and is configured with the following photographed materials. In other words, among the photographed materials of the "Camera E", the scene of the scene number "3" is configured with the photographed materials of "00:00:04;00" for four seconds from "−00:00:08;00" by 8 seconds prior to "00:00:00;00" of the event detection time to "−00:00:04;00" by 4 seconds prior to "00:00:00;00" of the event detection time. Next, the visual effect of "Dissolve" is added between the scene of the scene number "3" and the next scene of the scene number "4". In addition, with respect to the scene of the scene number "3", the reproduction speed thereof is set to "100%" indicating that the reproduction speed is equal to the original reproduction speed of the photographed material used for the corresponding scene, and the sound volume of the audio data there is set to "0" indicating that the sound volume of the audio data is equal to the sound volume of the original audio data of the photographed material used for the scene.

The scene associated with the 4th row, that is, the scene of the scene number "4" is "Ball is flying toward the stands" scene and is configured with the following photographed materials. In other words, among the photographed materials of the "Camera C", the scene of the scene number "4" is configured with the photographed materials of "00:00:04;00" for four seconds from "−00:00:04;00" by 4 seconds prior to "00:00:00;00" of the event detection time to "00:00:00;00" of the event detection time. Next, the visual effect of "Dissolve" is added between the scene of the scene number "4" and the next scene of the scene number "5". In addition, with respect to the scene of the scene number "4", the reproduction speed thereof is set to "100%" indicating that the reproduction speed is equal to the original reproduction speed of the photographed material used for the corresponding scene, and the sound volume of the audio data thereof is set to "−3" indicating that the sound volume of the audio data is smaller than the sound volume of the original audio data of the photographed material used for the scene. In addition, since it is predicted that large cheers come from the stands in the scene, the sound volume of the audio data of the scene of the scene number "4" is configured to be small.

The scene associated with the 5th row, that is, the scene of the scene number "5" is "Batter Up" scene and is configured with the following photographed materials. In other words, among the photographed materials of the "Camera D", the scene of the scene number "5" is configured with the photographed materials of "00:00:04;00" for four seconds from "−00:00:01;00" by one seconds prior to "00:00:00;00" of the event detection time to "00:00:03;00" by three seconds posterior to "00:00:00;00" of the event detection time. Next, the visual effect of "Dissolve" is added between the scene of the scene number "5" and the next scene of the scene number "6". In addition, with respect to the scene of the scene number "5", the reproduction speed thereof is set to "100%" indicating that the reproduction speed is equal to the original reproduction speed of the photographed material used for the corresponding scene, and the sound volume of the audio data there is set to "0" indicating that the sound volume of the audio data is equal to the sound volume of the original audio data of the photographed material used for the scene.

The scene associated with the 9th row, that is, the scene of the scene number "9" is the scene of "Score Display" and "CG" is stored in the "Material". Therefore, it may be understood that the scene associated with the 9th row is a scene configured with a CG image. More specifically, a predetermined CG image is used for two seconds "00:00:02;00". In addition, with respect to the scene of the scene number "9", the reproduction speed thereof is set to "100%" indicating that the reproduction speed is equal to the original reproduction speed of the CG image used for the corresponding scene; and the sound volume of the audio data thereof is set to "−2" indicating that the sound volume of the audio data is smaller than the sound volume of the audio data used for the corresponding CG image.

In addition, since it is predicted that the actual situation of the baseball game or the commentating announcer's comment is inserted in the scene, the sound volume of the audio data of the scene of the scene number "9" is configured to be small. In addition, the CG image is created according to the creating manipulation received by the manipulation reception unit 61. In addition, the CG image may be automatically created in correspondence with the event and be registered in the database 25.

The scene associated with the 10th row, that is, the scene of the scene number "10" is "Home Run (slow)" scene and is configured with the following photographed materials. In other words, among the photographed materials of the "Camera E", the scene of the scene number "10" is configured with the photographed materials of "00:00:03;00" for three seconds from "−00:00:10;00" by 10 seconds prior to "00:00:00; 00" of the event detection time to "−00:00:07;00" by 7 seconds prior to "00:00:00;00" of the event detection time. In addition, with respect to the scene of the scene number "10", the reproduction speed thereof is set to "50%" indicating that the reproduction speed is lower than the original reproduction speed of the photographed material used for the corresponding scene, and the sound volume of the audio data there is set to "0" indicating that the sound volume of the audio data is equal to the sound volume of the original audio data of the photographed material used for the scene.

In the embodiment, according to the template including the scenes of the scene numbers "1" to "10", the data of each scene are generated, and by combining these data, the digest of "Home Run" scene is created.

The template illustrated in FIG. 8 is registered an XML (Extensible Markup Language) format document like that illustrated in FIG. 9 in the database 25.

FIG. 9 illustrates a detailed example of the XML format data of the template.

In FIG. 9, the XML format data of the templates of the scene numbers "1" to "4" among the scene numbers "1" to "10" of FIG. 8 are written, and the templates of the scene numbers "5" to "10" are omitted in illustration. In addition, for the convenience of description, the row numbers are allocated to the left ends of the rows of FIG. 9.

The tag<?xml version="1.0" encoding="utf-8"?> of the 1st row indicates that the version of XML is "1.0" and XML character code is "utf-8".

The tag<template title="Template for Home Run" update-Date="2010-04-01"> of the 2nd row indicates that the template name is "Template for Home Run" and the update date is "2010-04-01".

The tag<scene index="1" of the 3rd row indicates that the "Scene Number" is "1".

The content stored in the item of "Comment" of the table of FIG. 8 is stored between tag<comment> and tag</comment> of the 4th row. For example, in the example of FIG. 9, it is written that "<comment>pitcher is pitching ball</comment>", and it may be understood that the example corresponds to the case where "Pitcher is pitching ball" is stored in "Comment" of the table of FIG. 8.

The content stored in the item of "Material" of the table of FIG. 8 is stored between tag<source> and tag</source> of the 5th row. For example, in the example of FIG. 9, it is written that "<source> camera E</source>", and it may be understood that the example corresponds to the case where "Camera E" is stored in "Material" of the table of FIG. 8.

The content stored in the item of "In Point" of the table of FIG. 8 is stored between tag<inTimecode> and tag</inTimecode> of the 6th row. For example, in the example of FIG. 9, it is written that "<inTimecode>−00:00:15;00</inTimecode>", and it may be understood that the example corresponds to the case where "−00:00:15;00" is stored in "In Point" of the table of FIG. 8.

The content stored in the item of "Out Point" of the table of FIG. 8 is stored between tag<outTimecode> and tag</outTimecode> of the 7th row. For example, in the example of FIG. 9, it is written that "<outTimecode>−00:00:10;00</outTimecode>", and it may be understood that the example corresponds to the case where "−00:00:10;00" is stored in "Out Point" of the table of FIG. 8.

The content stored in the item of "Duration" of the table of FIG. 8 is stored between tag<duration> and tag</duration> of the 8th row. For example, in the example of FIG. 9, it is written that "<duration>00:00:05;00</duration>", and it may be understood that the example corresponds to the case where "00:00:05;00" is stored in "Duration" of the table of FIG. 8.

The content stored in the item of "Effect" of the table of FIG. 8 is stored between tag<effect> and tag</effect> of the 9th row. For example, in the example of FIG. 9, it is written that "<effect>dissolve</effect>", and it may be understood that the example corresponds to the case where "Dissolve" is stored in "Effect" of the table of FIG. 8.

The content stored in the item of "Speed (%)" of the table of FIG. 8 is stored between tag<speed> and tag</speed> of the 10th row. For example, in the example of FIG. 9, it is written that "<speed>100</speed>", and it may be understood that the example corresponds to the case where "100" is stored in "Speed (%)" of the table of FIG. 8.

The content stored in the item of "AudioLevel (db)" of the table of FIG. 8 is stored between tag<audioLevel> and tag</audioLevel> of the 11th row. For example, in the example of FIG. 9, it is written that "<audioLevel>0</audioLevel>", and it may be understood that the example corresponds to the case where "0" is stored in "AudioLevel (db)" of the table of FIG. 8.

Returning to the description of the flowchart of FIG. 7, as described hereinbefore, in the case where the template is not registered in the database 25, NO is determined in Step S21, and the process proceeds to Step S22.

In Step S22, the creating unit 62 creates the digest template by creating the table of FIG. 8 (in actual case, an XML script of FIG. 9) based on the manipulation of the editor. The created digest template is registered in the database 25, and the process returns to Step S21. Therefore, YES is determined in Step S21, and the process proceeds to Step S23.

In Step S23, the manipulation reception unit 61 receives the input manipulation of the editor and determines whether or not the event detecting condition is registered in the database 25. In other words, the manipulation reception unit 61 determines whether or not the event detecting condition illustrated in FIG. 6 is registered in the database 25.

In the case where the event detecting condition is not registered in the database 25, NO is determined in Step S23, and the process proceeds to Step S24.

In Step S24, the creating unit 62 creates the event detecting condition based on the manipulation of the editor. The created event detecting condition is registered in the database 25, and the process returns to Step S23. Therefore, YES is determined in Step S23, and the process proceeds to Step S25.

In Step S25, the manipulation reception unit 61 receives the input manipulation of the editor and determines whether or not the corresponding information is registered in the database 25.

Herein, a detailed example of the corresponding information is described with reference to FIG. 10.

[Corresponding Information]

FIG. 10 is a diagram illustrating a detailed example of the corresponding information.

FIG. 10 illustrates an example of the corresponding information of the case where the content of the photographed material is a baseball game.

In the example of FIG. 10, the corresponding information is registered as a table having a matrix structure in the database 25. The table includes items of "Event Name", "Template Name", and "Template Path" in the column direction.

The type of the event is written in the item of the "Event Name" of a predetermined row of the table of FIG. 10.

The type of the template corresponding to the type of the event is written in the "Template Name" of a predetermined row of the table of FIG. 10.

The material of the corresponding template on the database 25 is written in the "Template Path" of a predetermined row of the table of FIG. 10.

For example, it may be understood that the template name corresponding to the event name "Home Run" is "Template for Home Run", and the template is registered in "C:\ . . . \homerun.xml" on the database 25.

It may be understood that the template name corresponding to the event name "Grand Slam" is "Template for Grand Slam", and the template is registered in, and the template is registered in "C:\ . . . \grand slam hr.xml" on the database 25.

It may be understood that the template name corresponding to the event name "Game-Reversing Home Run" is "Template for Game-Reversing Home Run", and the template is registered in "C:\ . . . \come_from_behind_hr.xml" on the database 25.

It may be understood that the template name corresponding to the event name "Bunt" is "Template for Bunt", and the template is registered in "C:\ . . . \bunt.xml" on the database 25.

Returning to the description of the flowchart of FIG. 7, as described hereinbefore, in the case where the corresponding condition is not registered in the database 25, NO is determined in Step S25, and the process proceeds to Step S26.

In Step S26, the creating unit 62 creates the corresponding condition by creating the table of FIG. 10 based on the manipulation of the editor. The created corresponding condition is registered in the database 25, and the process returns to Step S25. Therefore, YES is determined in Step S25, and the editing condition creating process is ended.

In the state where the editing condition creating process illustrated in FIG. 7 is ended, if a photographed material is transmitted from the photographing section 11, the editing server 24 creates a digest by using the editing condition and performs a series of process up to the time when the digest is transmitted to the delivering section 13. Hereinafter, a series of the processes of the editing server 24 is referred to as an editing process.

[Editing Process]

Figure 11:
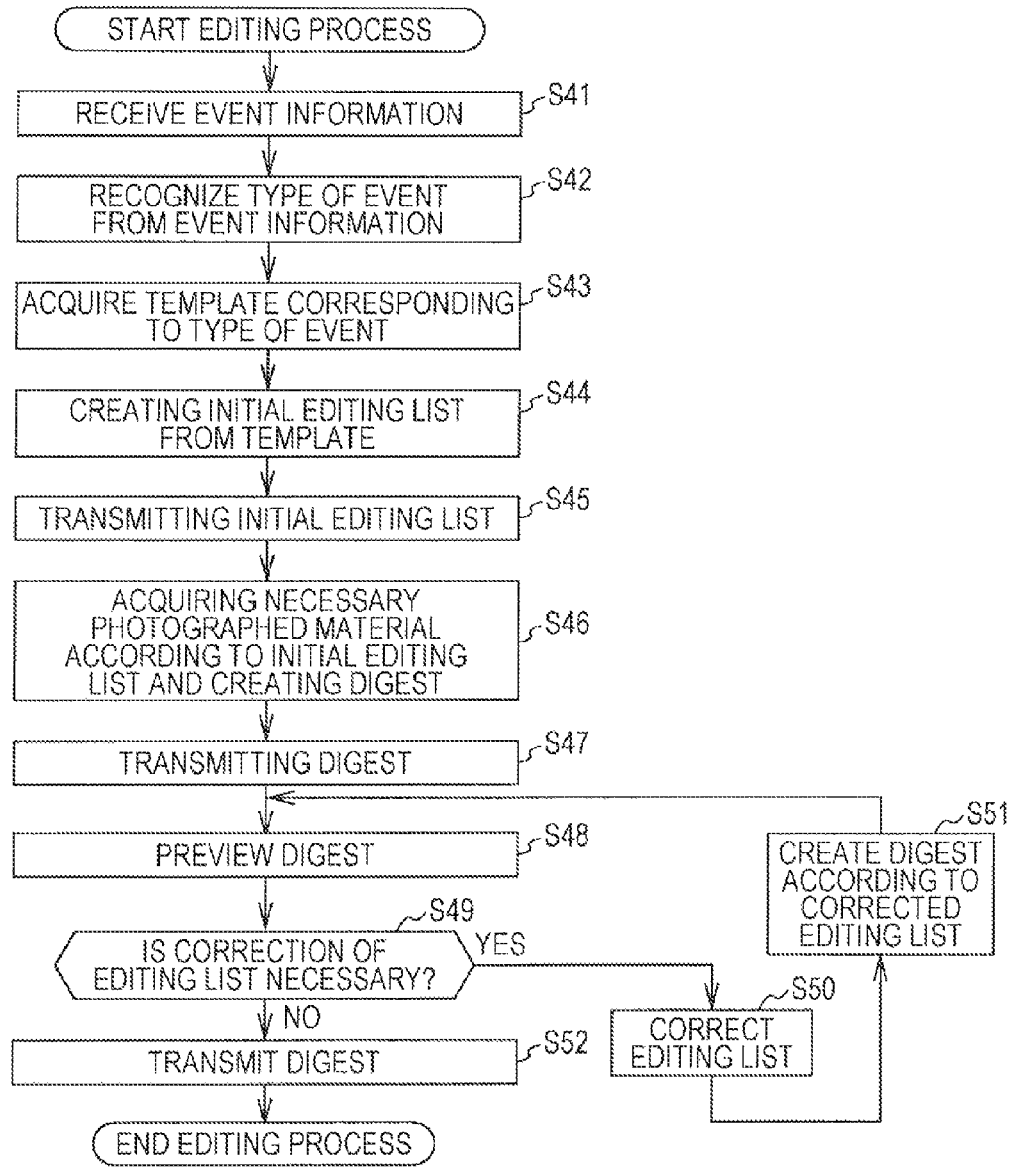
FIG. 11 is a flowchart illustrating a flow of editing process.

FIG. 11 is a flowchart illustrating a flow of the editing process of the editing server 24. The process is repetitively performed every time when the event information is transmitted from the photographing section 11.

In Step S41, the receiving unit 71 receives the event information corresponding to the photographed material of one second unit from the photographing section 11.

Herein, for example, it is described that the receiving unit 71 receives the event information of "Home Run" generated in Step S3 of FIG. 5. In addition, in parallel to the editing process, even after that, the receiving unit 71 is configured so as to sequentially receive the event information corresponding to the photographed material of one second unit from the photographing section 11.

In Step S42, the event information recognizing unit 72 recognizes the type of the event from the event information received at the time point of the process of Step S41. For example, the event information recognizing unit 72 recognizes from the event information indicating the received "Home Run" that the type of the event is "Home Run".

In Step S43, the template acquiring unit 73 acquires the template corresponding to the type of the event recognized in the process of Step S42 by referring to the corresponding information registered in the database 25. For example, the template acquiring unit 73 acquires the template "Template for Home Run" corresponding to the event of the type of "Home Run" from "C:\ . . . \homerun.xml" of the database 25 by referring to the corresponding information illustrated in FIG. 10.

In Step S44, the editing list creating unit 74 creates an initial editing list from the template. As described later, in the case where the editing list is corrected, the editing list which is first created is referred to as an initial editing list herein.

Herein, a detailed example of the editing list is described with reference to FIG. 12.

[Editing List]

FIG. 12 is a diagram illustrating a detailed example of the editing list.

As illustrated in FIG. 12, the editing list includes the data of the plurality of scenes as the XML format data. The editing list is created from the XML format data of the template illustrated in FIG. 9 and is the same as the XML format data of the template of FIG. 9 excluding some portions thereof. Therefore, among the XML format data of the editing list of FIG. 12, the redundant description of the data which are the same as the XML format data of the template of FIG. 9 is omitted, but the description is made on only the different data. In addition, in FIG. 12, the XML format data of the editing list of the scene numbers "1" to "4" among the scene numbers "1" to "10" of FIG. 9 are written, and the editing lists of the scene numbers "5" to "10" are omitted in illustration. In addition, for the convenience of description, the row numbers are allocated to the left ends of the rows of FIG. 12.

The tag <edl title="20100401-19-00-00-00"> of the 2nd row indicates that the editing list name is "20100401-19-00-00-00". In this editing list, the editing list name is set to the time when the event is detected. In other words, it may be understood from the editing list name that the time point when the event "Home Run" is detected is the frame of 19 hours, 00 minute, 00 second, 00 frame "19:00:00;00" of Apr. 1, 2010 "20100401". In addition, "edl" denotes the editing list (Edit Decision List).

With respect to the XML format data of the editing list of the "Scene Number" of "1", similarly to the XML format data of the template of FIG. 9, the XML format data of the editing list are written in the 3rd row through the 12th row. Among them, the XML format data of the editing list of the 6th row and the 7th row are different from the XML format data of the template of FIG. 9.

The time point of "In Point" is stored between tag<inTimecode> and tag</inTimecode> of the 6th row. For example, in the example of FIG. 12, it is written that "<inTimecode>18:59:45;00</inTimecode>", and it indicates that the scene of which the "Scene Number" is "1" starts at the time point of "18:59:45;00" which is earlier by 15 seconds than the event detection time point of "19:00:00;00".

The time point of "Out Point" is stored between tag<outTimecode> and tag</outTimecode> of the 7th row. For example, in the example of FIG. 12, it is written that "<outTimecode>18:59:50;00</outTimecode>", and it indicates that the scene of which the "Scene Number" is "1" ends at the time point of "18:59:50;00" which is earlier by 10 seconds than the event detection time point of "19:00:00;00".

In other words, it may be understood from the 6th row and the 7th row that the scene of which the "Scene Number" is "1" is the scene configured with the photographed materials from the time point by 15 seconds prior to the event detection time to the time point by 10 seconds prior to the event detection time.

With respect to the XML format data of the editing list of the "Scene Number" of "2", similarly to the XML format data of the template of FIG. 9, the XML format data of the editing list are written in the rows from the 13th row to the 22nd row. Among them, the XML format data of the editing list of the 16th row and the 17th are different from the XML format data of the template of FIG. 9.

The time point of "In Point" is stored between tag<inTimecode> and tag</inTimecode> of the 16th row. For example, in the example of FIG. 12, it is written that "<inTimecode>18:59:50;00</inTimecode>", and it indicates that the scene of which the "Scene Number" is "2" starts at the time point of "18:59:50;00" which is earlier by 10 seconds than the event detection time point of "19:00:00;00".

The time point of "Out Point" is stored in tag<outTimecode> and tag</outTimecode> of the 17 th row. For example, in the example of FIG. 12, it is written that "<outTimecode>18:59:53;00</outTimecode>", and it indicates that the scene of which the "Scene Number" is "2" ends at the time point of "18:59:53;00" which is earlier by 7 seconds than the event detection time point of "19:00:00;00".

In other words, it may be understood from the 16th row and the 17th row that the scene of which the "Scene Number" is "2" is the scene configured with the photographed materials from the time point by 10 seconds prior to the event detection time to the time point by 7 seconds prior to the event detection time.

The XML format data of the editing list of FIG. 12 is different from the XML format data of the template of FIG. 9 in that tag<inTimecode> and tag</inTimecode> and tag<outTimecode> and tag</outTimecode> are written. In other words, in the XML format data of the template illustrated in FIG. 9, the time codes of the case where the time code of the event detection time is set to "00:00:00;00" are written in "In Point" and "Out Point". On the contrary, in the XML format data of the editing list illustrated in FIG. 12, the time points of the case where real time point of the event detection time is used as reference are written in "In Point" and "Out Point".

Returning to the description of the flowchart of FIG. 11, as described hereinbefore, if the initial editing list is created, the process proceeds to Step S45.

In Step S45, the transmitting unit 77 transmits the initial editing list to the delivering section 13. In other words, by taking into consideration the case where much time is taken for the later-described processes of Step S46 and the following steps, the initial editing list is transmitted to the delivering section 13. Next, in the delivering section 13, the digest is created from the photographed material received from the photographing section 11 according to the received initial editing list. Accordingly, although much time is taken for the processes of Step S46 and the following steps, it is possible to securely select the to-be-transmitted digest through the later-described process of Step S75 of FIG. 13, so that it is possible to prevent the digest from not being delivered.

In Step S46, the digest creating unit 75 creates the digest by acquiring the necessary photographed material according to the initial editing list. In other words, the digest creating unit 75 acquires the necessary photographed material from the recording server 22, generates the data of the scenes of the types of the scene numbers "1" to "10" according to the editing list illustrated in FIG. 12, and creates the digest by connecting the data of the scenes of the types.

In Step S47, the transmitting unit 77 transmits the digest to the delivering section 13. In other words, the transmitting unit 77 transmits the digest, which is created by the editing list which is first created, that is, the uncorrected initial editing list, to the delivering section 13.

In Step S48, the preview controller 76 displays previews of the video of the digest on the displaying unit 70. In addition, in the case where the photographed material, which is to be included in the data of the scene of the type of the scene number written in the editing list, is not yet recorded and the photographed material is not recorded in the recording server 22, the scene of the type of the scene number is not previewed.

In Step S49, the manipulation reception unit 61 determines based on the manipulation of the editor whether or not the correction of the editing list is necessary.

In other words, while the editor watches the digest of which the previews are displayed, the editor checks whether or not there is no problem in each of the scene constituting the digest. For example, due to the disorder of the predetermined photographing apparatus 21-K included in the editing list, in the case where there is no photographed material of the photographing apparatus 21-K, since the video of the corresponding scene is not previewed, the editor recognizes that there is a problem. In this case, the editor performs a predetermined input manipulation on the editing terminal 23 to instruct the correction of the editing list.

In the case where the correction of the editing list is instructed, YES is determined in Step S49, and the process proceeds to Step S50.

In Step S50, the editing list creating unit 74 corrects the editing list. In other words, the editing list creating unit 74 corrects the problematic portion in the editing list to update the editing list.

In addition, with respect to the problematic portion, the editor performs a predetermined input manipulation on the editing terminal 23 so as to instruct the correction. In other words, the content of the correcting instruction from the manipulation is analyzed by the manipulation reception unit 61 and is notified to the editing list creating unit 74. The editing list creating unit 74 corrects the problematic portion of the to-be-corrected editing list based on the notified content of the instruction.

For example, in the case where there is a content of the instruction indicating that the photographing apparatus 21-K is in disorder, among the photographed materials included in the editing list, the editing list creating unit 74 corrects the script between tag<source> and tag</source> of the editing list so that the photographed material of the disordered photographing apparatus 21-K is replaced with the photographed material of another photographing apparatus 21.

In Step S51, the digest creating unit 75 created the digest according to the corrected editing list.

In this manner, if the digest is created through the process of Step S51 according to the corrected editing list, the process returns to Step S48, and the following processes are performed. In this case, the preview of the digest created again according to the corrected editing list is displayed.

After that it is determined by the editor that the correction of the editing list is necessary. During the performing of a predetermined manipulation, the looping process of Steps S48 to S51 is repetitively performed. Every time it happens, the editing list is corrected, and the digest is created again according to the corrected editing list, so that the preview thereof is displayed.

Finally, in the case where it is determined that the correction of the editing list is not necessary and a message is instructed by a predetermined input manipulation to the editing terminal 23, NO is determined in Step S49, and the process proceeds to Step S52.

In Step S52, the transmitting unit 77 transmits the digest to the delivering section 13.

Therefore, the editing process is ended.

In addition, in an actual case, the process of Step S47 and the processes of Steps S48 to S52 are simultaneously performed in parallel. In other words, by taking into consideration the time taken for the process of correcting the editing list, the digest which is created by the initial editing list and may be created in a short time is first transmitted to the delivering section 13. Accordingly, it is possible to securely select the digest created by the initial editing list as the to-be-delivered digest through the later-described process of Step S75 of FIG. 13, so that it is possible to prevent the digest from not being delivered.

For example, in the case where a broadcasting program is configured as one unit, several events may occur in the one unit. For example, in a baseball game, the events of a type of "Home Run" and the events of a type of "Strikeout" as different events may occur discretely in time. In addition, in some case, several events of the same type of "Home Run" may occur discretely in time. In these cases, every time when the event occurs in one unit, the editing process is independently performed. In other words, the digests of which the number is the same as the number of the events occurring in one unit are generated, and the digests are transmitted to the delivering section 13.

If the editing process illustrated in FIG. 11 is performed and the created digest is transmitted to the delivering section 13, the digest is delivered by the delivering section 13 according to the delivering instruction from the editor. Hereinafter, a series of processes of the delivering section 13 is referred to as a delivering process.

[Delivering Process]

Figure 13:
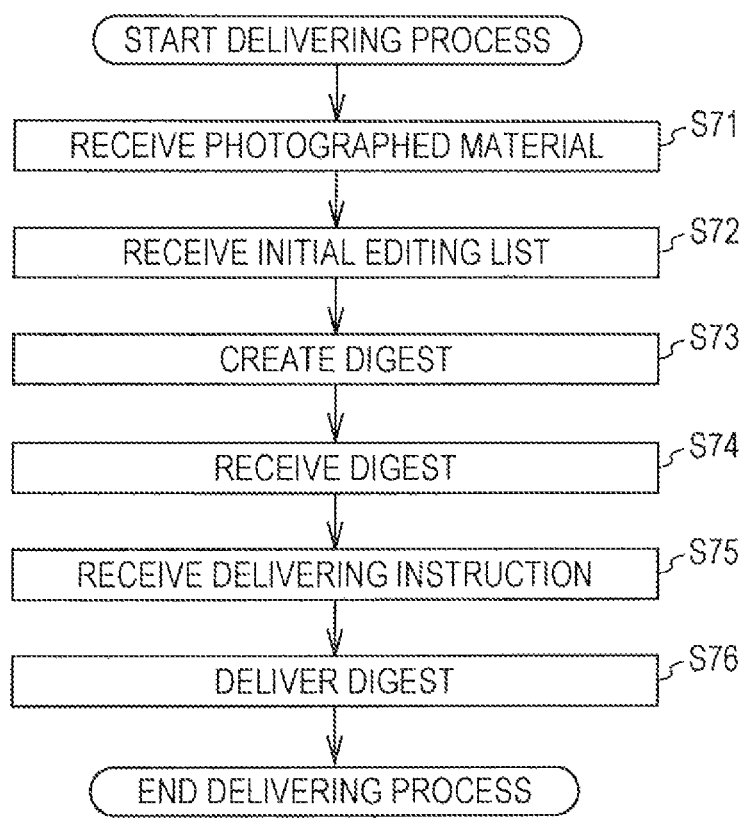
FIG. 13 is a flowchart illustrating a flow of a delivering process.

FIG. 13 is a flowchart illustrating a flow of the delivering process of the delivering section 13.

In Step S71, the receiving unit 101 receives a photographed material. In other words, the receiving unit 101 receives the photographed material transmitted in Step S5 of FIG. 5.

In Step S72, the receiving unit 101 receives an initial editing list. In other words, the receiving unit 101 receives the initial editing list transmitted in Step S45 of FIG. 11.

In Step S73, the digest creating unit 102 creates a digest from the photographed material according to the initial editing list. In other words, the digest created in Step S73 is completed faster than the digest which is created by the processes of Step S46 and Step S51 of FIG. 11 and, after that, transmitted.

In Step S74, the receiving unit 101 receives the digest. In other words, the receiving unit 101 receives the digest which is created according to the uncorrected editing list and transmitted in Step S47 of FIG. 11 and the digest which is created according to the corrected editing list and transmitted in Step S52 of FIG. 11.

In Step S75, the manipulation reception unit 91 receives the delivering instruction from the editor. In other words, the manipulation reception unit 91 may receives instructions of the digest delivering time point or the like. In addition, in the case where there are a plurality of the digests, a digest may be selected among the digests and a combination thereof may be received. In addition, according to the time interval from the end of the recording of the photographed material to the delivery of the digest, the digest created by the digest creating unit 102, the digest created according to the uncorrected editing list, or the digest created according to the corrected editing list may be selected. In addition, the process of Step S75 and the later-described process of Step S76 may be performed at the time when the digest is created by the digest creating unit 102 in Step S73.

In Step S76, the delivering unit 103 delivers the digest according to the delivering instruction.

Therefore, the delivering process is ended. In addition, in some cases, the delivering server 28 delivers the photographed material received from the recording server 22, as it is, based on the instruction of the editor.

In this manner, since the task of selecting the to-be-used photographed material or providing a visual effect is omitted by using a template which is prepared in advance, it is possible to create the digest in a short time. In addition, since necessary manipulations may be easily performed by the editor, even an editor who is not skillful in editing in a short time may create the digest in a short time. In addition, the digest created by using the template may be used as a digest after coarse editing. In other words, with respect to the created digest, Splite editing for cutting a portion of a scene, Insert editing for replacing with another video, adjusting of AudioLevel, and the like are performed, so that it is possible to improve a degree of completion of the digest.

The present disclosure may be applied to an information processing apparatus including a time differential delivery system.

[Application of the Present Disclosure to Program]

A series of the aforementioned processes may be performed by hardware or software.

Figure 14:
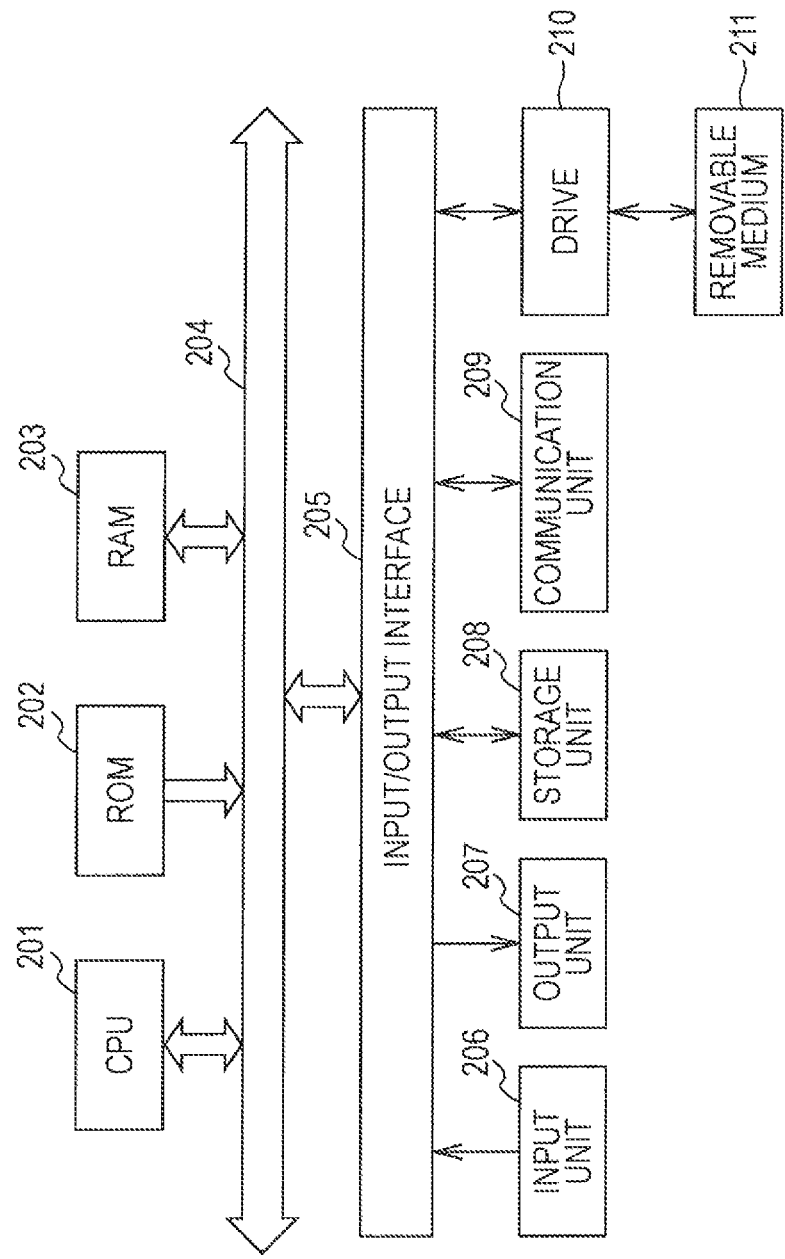

In this case, at least a portion of the aforementioned information processing apparatus may be implemented by employing, for example, a personal computer illustrated in FIG. 14.

In FIG. 14, a CPU (Central Processing Unit) 201 executes various processes according to a program recorded in a ROM (Read Only Memory) 202. Alternatively, the CPU 201 executes various processes according to a program loaded on a RAM (Random Access Memory) 203 from a storage unit 208. In addition, the RAM 203 appropriately stores data or the like necessary for the CPU 201 to execute various processes.

The CPU 201, the ROM 202, and the RAM 203 are connected to each other via a bus 204. In addition, an input/output interface 205 is connected to the bus 204.

An input unit 206 such as a keyboard and a mouse and an output unit 207 such as a display are connected to the input/output interface 205. In addition, the storage unit 208 configured with a hard disk or the like and a communication unit 209 configured with a modem, a terminal adaptor, or the like are connected to the input/output interface 205. The communication unit 209 controls communication with other apparatuses (not shown) through a network including the Internet.

In addition, a drive 210 is connected to the input/output interface 205 if necessary, and a removable medium 211 such as a magnetic disk, an optical disc, a magneto-optical disc, or a semiconductor memory is appropriately mounted. Therefore, a computer program read therefrom is installed in the storage unit 208 if necessary.

In the case where a series of processes are executed by software, a program constituting the software is installed on a computer which is assembled into dedicated hardware, for example, a general purpose computer where various programs are installed to execute various function, or the like from a network or a recording medium.

As illustrated in FIG. 14, a recording medium including the program is constructed with a removable medium (a package medium) 211, which is distributed so as to provide a program to a user in the state where the program is recorded therein, such as a magnetic disk (including a floppy disk), an optical disc (including a CD-ROM (Compact Disc-Read Only Memory) and a DVD (Digital Versatile Disc)), a magneto-optical disc (including an MD (Mini-Disc)), or a semiconductor memory in separation with a main body of the apparatus. In addition, the recording medium may be constructed with a ROM 202, which is provided to a user in the state where the ROM 202 is assembled in advance with a main body of the apparatus and the program is recorded therein, a hard disk included in the storage unit 208, or the like.

In addition, in the specification, the steps writing the program recorded in the recording medium may include processes which are performed in time sequence according to the procedure, and although the steps may not necessarily be processed in the time sequence, the steps may also include processes which are performed in parallel or individually.

In addition, in the specification, a system denotes an entire apparatus configured with a plurality of apparatuses, means, and the like.

The present disclosure contains subject matter related to that disclosed in Japanese Priority Patent Application JP 2010-227501 filed in the Japan Patent Office on Oct. 7, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a receiving unit which receives event information capable of specifying a type of an event;
a template acquiring unit which acquires a template of the event of the type specified by the event information received by the receiving unit as a template which becomes a source of an editing list of a plurality of scenes:
an editing condition creating unit which creates editing conditions which include (a) the template, (b) an event detecting condition for detecting an occurrence of the event, and (c) corresponding information which indicates a correspondence relationship between the type of the event and the template,
wherein the template includes time codes indicating a starting time point and an ending time point of each of the plurality of scenes, a time interval between the starting time point and the ending time point of each of the plurality of scenes, a visual effect added between each of the plurality of scenes and a following scene, and a reproduction speed of each of the plurality of scenes;
an editing list creating unit which creates the editing list of the plurality of scenes based on the template acquired by the template acquiring unit; and
a digest creating unit which creates data of the plurality of scenes included in the editing list created by the editing list creating unit from one or more photographed materials acquired from another information processing apparatus and creates a digest by combining the created data of the plurality of scenes,
wherein the event denotes an action of a subject in the one or more photographed materials, the event information specifies a type of the action, and the template is associated with said type of action.

2. The information processing apparatus according to claim 1, further comprising a preview controller which allows a video of the digest to be previewed.

3. The information processing apparatus according to claim 2, further comprising an editing list updating unit which corrects and updates the editing list created by the editing list creating unit,
wherein the digest creating unit creates the data of the plurality of scenes included in the editing list updated by the editing list updating unit from the one or more photographed materials acquired from the another information processing apparatus and creates the digest by combining the created data of the plurality of scenes.

4. The information processing apparatus according to claim 3, wherein the digest creating unit creates the editing list created by the editing list creating unit and the data of the plurality of scenes included in the editing list updated by the editing list updating unit from the one or more photographed materials acquired from the another information processing apparatus and creates each digest by combining the created data of the plurality of scenes.

5. An information processing method comprising:
receiving event information capable of specifying a type of an event;
acquiring a template of the event of the type specified by the event information received by the process of receiving the event information as a template which becomes a source of an editing list of a plurality of scenes;
creating editing conditions which include (a) the template, (b) an event detecting condition for detecting an occurrence of the event, and (c) corresponding information which indicates a correspondence relationship between the type of the event and the template,
wherein the template includes time codes indicating a starting nine point and an ending time point of each of the plurality of scenes, a time interval between the starting time point and the ending time point of each of the plurality of scenes, a visual effect added between each of the plurality of scenes and a following scene, and a reproduction speed of each of the plurality of scenes;
creating the editing list of the plurality of scenes based on the template acquired by the process of acquiring the template; and
creating data of the plurality of scenes included in the editing list created by the process of creating the editing list from the one or more photographed materials acquired from another information processing apparatus and creating a digest by combining the created data of the plurality of scenes,
wherein the event denotes an action of a subject in the one or more photographed materials, the event information specifies a type of the action, and the template is associated with said type of action.

6. A non-transitory computer-readable recording medium for storing a computer program that when executed on a computer causes the computer to execute a control process comprising the steps of:
receiving event information capable of specifying a type of an event;
acquiring a template of the event of the type specified by the event information as a template which becomes a source of an editing list of a plurality of scenes;
creating editing conditions which include (a) the template, (b) an event detecting condition for detecting an occurrence of the event, and (c) corresponding information which indicates a correspondence relationship between the type of the event and the template,
wherein the template includes time codes indicating a starting time point and an ending time point of each of the plurality of scenes, a time interval between the starting time point and the ending time point of each of the plurality of scenes, a visual effect added between each of the plurality of scenes and a following scene, and reproduction speed of each of the plurality of scenes;

creating the acquired editing list of the plurality of scenes based on the acquired template; and creating data of the plurality of scenes included in the created editing list from the one or more photographed materials acquired from another information processing apparatus and creating a digest by combining the created data of the plurality of scenes, wherein the event denotes an action a subject in the or more photographed materials, the event information specifies a type of the action, and the template is associated with said type of action.

7. An information processing apparatus comprising:

an event detecting unit which detects a photographed material including an event satisfying one or more event detecting conditions which are set in advance;

an event information generating unit which generates event information capable of specifying a type of the event, which is described in a template which becomes a so of an editing list of a plurality of scenes, wherein editing conditions are created to include (a) the template, (b) the one or more event detecting conditions for detecting an occurrence of the event, and (c) corresponding information which indicates a correspondence relationship between the type of the event and the template, and wherein the template includes time codes indicating a starting time point and an ending time point of each of the plurality of scenes, at time interval between the starting time point and the ending time point of each of the plurality of scenes, a visual effect added between each of the plurality of scenes and a following scene, and a reproduction speed of each of the plurality of scenes; and a transmitting unit which transmits the event information generated by the event information generating unit to another information processing apparatus, wherein the event denotes an action of a subject in the photographed material, the event information specifies a type of the action, and the template is associated with said type of action.

8. The information processing apparatus according to claim 7, wherein the event detecting condition is a predetermined keyword included in an audio of the photographed material.

9. The information processing apparatus according to claim 7, wherein the event detecting condition is a condition that there is a predetermined instruction manipulation of a user, and wherein when there is the predetermined instruction manipulation of the user with respect to a photographed material, the event detecting unit determines that an event is included in the photographed material and detects the photographed material including photographed data corresponding to the event.

10. An information processing method comprising:

detecting a photographed material including an event satisfying one or more event detecting conditions which are set in advance;

generating event information capable of specifying a type of the event, which is described in a template which becomes a source of an editing list of a plurality of scenes, wherein editing conditions are created to include (a) the template, (b) the one or more event detecting conditions for detecting an occurrence of the event, and (c) corresponding information which indicates a correspondence relationship between the type of the event and the template, and wherein the template includes time codes indicating a starting time point and an ending time point of each of the plurality of scenes, a time interval between the starting time point and the ending time point of each of the plurality of scenes, a visual effect added between each of the plurality of scenes and a following scene, and a reproduction speed of each of the plurality of scenes; and transmitting the event information generated by the process of generating the event information to another information processing apparatus, wherein the event denotes an action of a subject in the photographed material, the event information specifies a type of the action, and the template is associated with said type of action.

11. A non-transitory computer-readable recording medium for storing a computer program that when executed on a computer causes the computer to execute a control process comprising the steps of:

detecting a photographed material including an event satisfying one or more event detecting conditions which are set in advance;

generating event information capable of specifying a type of the event, which is described in a template which becomes a source of an editing list of a plurality of scenes, wherein editing conditions are created to include (a) the template, (b) the one or more event detecting conditions for detecting an occurrence of the event, and (c) corresponding information which indicates a correspondence relationship between the type of the event and the template, and wherein the template includes time codes indicating a starting time point and an ending time point of each of the plurality of scenes, a time interval between the starting time point and the ending time point of each of the plurality of scenes, a visual effect added between each of the plurality of scenes and a following scene, and a reproduction speed of each of the plurality of scenes; and transmitting the generated event information to another information processing apparatus, wherein the event denotes an action of a subject in the photographed material, the event information specifies a type of the action, and the template is associated with said type of action.

12. An information processing system comprising a first information processing apparatus and a second information processing apparatus, wherein the first information processing apparatus includes:

an event detecting unit which detects a photographed material including an event satisfying one or more event detecting conditions which are set in advance;

an event information generating unit which generates event information capable of specifying a type of the event; and a transmitting unit which transmits the event information generated by the event information generating unit to the second information processing apparatus, and wherein the second information processing apparatus includes:

a receiving unit which receives the event information;

a template acquiring unit which acquires a template of the event of the type specified by the event information received by the receiving unit as a template which becomes a source of an editing list of a plurality of scenes;

an editing condition creating unit which creates editing conditions which include (a) the template, (b) an event detecting condition for detecting an occurrence of the event, and (c) corresponding information which indicates a correspondence relationship between the type of the event and the template, wherein the template includes time codes indicating a starting time point and an ending time point of each of the plurality of scenes, a time interval between the starting time point and the ending time point of each of the plurality of scenes, a visual effect added between each of the plurality of scenes and a following scene, and a reproduction speed of each of the plurality of scenes;

an editing list creating unit which creates the editing list of the plurality of scenes based on the template acquired by the template acquiring unit; and a digest creating unit which creates data of the plurality of scenes included in the editing list created by the editing list creating unit from one or more photographed materials acquired from the first information processing apparatus and creates a digest by combining the created data of the plurality of scenes, wherein the event denotes an action of a subject in the photographed material, the event information specifies a type of the action, and the template is associated with said type of action.

* * * * *